United States Patent [19]

Suzuki et al.

[11] Patent Number: 5,706,385
[45] Date of Patent: Jan. 6, 1998

[54] ROTARY HEAD TYPE MAGNETIC RECORDING AND REPRODUCING APPARATUS

[75] Inventors: Hideaki Suzuki; Susumu Yoshida; Nobutaka Amada; Toshifumi Takeuchi; Takao Arai, all of Yokohama, Japan

[73] Assignee: Hitachi, Ltd., Tokyo, Japan

[21] Appl. No.: 351,649

[22] Filed: Dec. 7, 1994

[30] Foreign Application Priority Data

Dec. 8, 1993 [JP] Japan ............... 5-308001
Dec. 21, 1993 [JP] Japan ............... 5-322325

[51] Int. Cl.⁶ .................. H04N 15/226; H04N 5/11; H04N 9/99
[52] U.S. Cl. ................... 386/34; 386/124; 386/96
[58] Field of Search ................ 358/343, 341, 358/342, 335, 310; 360/32, 33.1, 19.1; 348/642, 705, 711; 386/27, 33, 34, 29, 92, 95, 96, 109, 111, 112, 116, 124; H04N 5/926, 5/19, 9/79

[56] References Cited

U.S. PATENT DOCUMENTS

| | | | |
|---|---|---|---|
| 4,847,701 | 7/1989 | Suesada | 358/335 |
| 5,027,229 | 6/1991 | Suwa et al. | |
| 5,119,243 | 6/1992 | Shimazaki et al. | 360/46 |
| 5,218,454 | 6/1993 | Nagawasa et al. | 358/343 |
| 5,369,448 | 11/1994 | Lee | 348/668 |

FOREIGN PATENT DOCUMENTS 42 00 222 A1  7/1993  Germany.

*Primary Examiner*—Robert Chevalier
*Attorney, Agent, or Firm*—Antonelli, Terry, Stout, & Kraus, LLP

[57] ABSTRACT

A rotary head type magnetic recording and reproducing apparatus for recording and reproducing an analog wideband video signal, audio signal and compressed digital signal on the same recording medium. The modulated analog wide-band video signal or the narrow-band-converted compressed digital signal is recorded on two video tracks adjacent to each other on a magnetic tape by magnetic heads on a rotary drum.

32 Claims, 20 Drawing Sheets

FE : ERASING MAGNETIC HEAD
Du : DUMMY HEAD

FE : ERASING MAGNETIC HEAD
Du : DUMMY HEAD

FE : ERASING MAGNETIC HEAD
Du : DUMMY HEAD

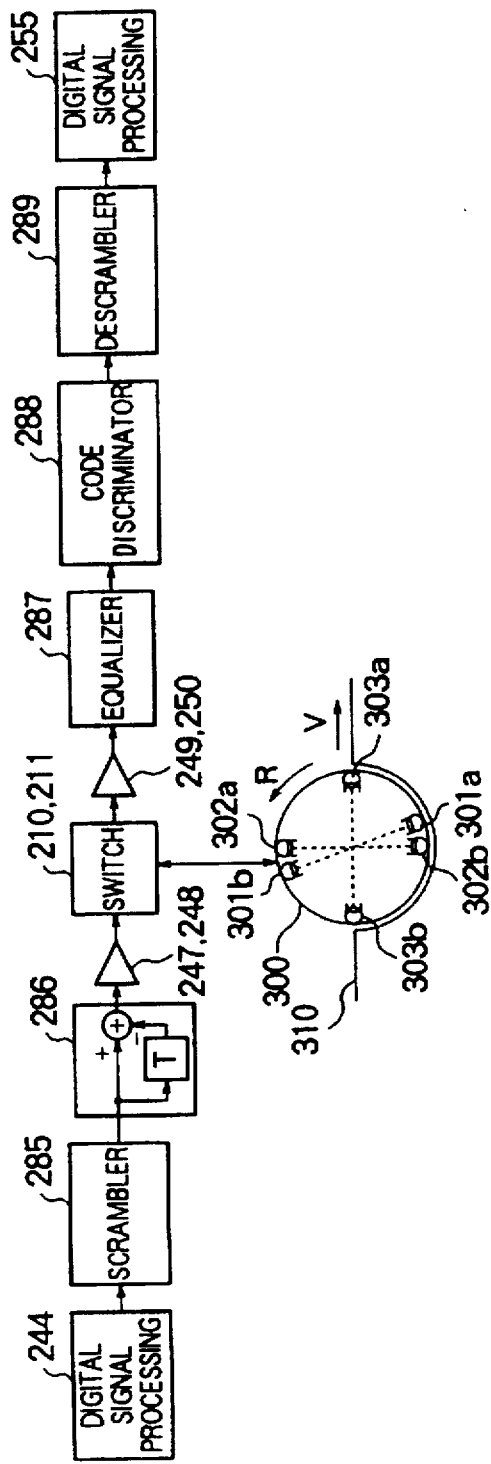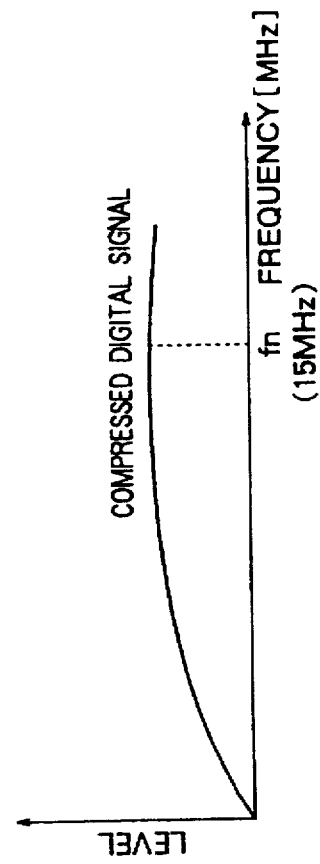

ROTARY HEAD TYPE MAGNETIC RECORDING AND REPRODUCING APPARATUS

BACKGROUND OF THE INVENTION

This invention relates to a rotary head type magnetic recording and reproducing apparatus for recording and reproducing video and audio signals, and particularly to a rotary head type magnetic recording and reproducing apparatus for recording and reproducing a wide-band video signal or a highly-efficicent-encoded compressed digital signal.

As household video and audio signal recording and reproducing apparatuses, analog VTR's of VHS HiFi and S-VHS systems have been in wide use. With regard to the video signal, the luminance signal, which has been frequency-modulated, and the carrier chrominance signal, which has been converted to a low frequency band, are multiplexed in frequency division, and the multiplexed signal is recorded or reproduced on the tracks formed in the oblique direction on a magnetic tape with rotary heads for the video signal. In high-speed reproduction, however, with the tape running at high speed, the rotary heads for video signal reproduce several tracks together in such a manner that the rotary heads sweep them transversely. In recording the audio signals, the frequency-modulated audio signals of the L- and R-channels are recorded on the same tracks as the video signal, but the audio signals are recorded into the deeper-layer portion of the tape and reproduced therefrom by the audio signal heads having an azimuth angle different from that of the rotary heads for the video signal. Moreover, an audio signal of PCM channel provided as an optional function is QPSK-modulated and then multiplexed in frequency division with the audio signals of the L- and R-channels, which have been frequency-modulated, and the multiplexed audio signal is recorded on the same tracks as the video signal but into the deeper-level portion of the tape and reproduced therefrom by the rotary heads for the audio signal.

Meanwhile, progress has been made toward the practical application of analog wide-band video signals in realizing higher resolution than that of the current analog video signals of NTSC, PAL or the like. Let us compare the main parameters between the current analog video signals of NTSC system or the like and the analog wide-band video signal. The number of scanning lines is 525 for the former and 1125 for the latter, the aspect ratio is 4:3 for the former and 16:9 for the latter, and the frequency band of the luminance signal is 4.2 MHz for the former and 20 MHz for the latter.

Efforts have been directed toward the practical application of digital television broadcasting as the next-generation television broadcasting. As reported in the "Journal of the Institute of Television Engineers of Japan" Vol. 46, No. 3, pp. 276–283 (1992), projects have been actively pushed forward for digital broadcasting by efficient coding of the analog wide-band video signal, among them are the U.S. ATRC-proposed AD-HDTV system, DigiCipher by GI/MIT, and the DSC-HDTV system by Zenith/AT & T.

SUMMARY OF THE INVENTION

It is anticipated that broadcasting using the analog wideband video signal and the digital video signal will materialize in the near future. However, in the household analog VTR's of the current systems, no considerations have been made about recording and reproduction of the analog wideband video signal and compressed digital signal in digital television broadcasting.

It is desired that the rotary head type magnetic recording and reproducing apparatus to be developed for such future television broadcasting should be compatible with the current analog VTR's.

Therefore, an object of the present invention is to provide a rotary head type magnetic recording and reproducing apparatus for recording and reproducing the analog wideband video signal and the highly-efficicent-encoded compressed digital signal for digital television broadcasting.

In order to achieve the above object, the rotary head type magnetic recording and reproducing apparatus according to an aspect of the present invention is made up of a first record signal generating circuit for generating a first record signal in a recording format suitable for recording on the magnetic tape from an input analog video signal; a second record signal generating circuit for generating a second record signal in a recording format suitable for recording on the magnetic tape from an input analog audio signal; a third record signal generating circuit for generating a third record signal in a recording format suitable for recording on the magnetic tape from an input compressed digital signal including video and audio information; a recording and reproducing mechanism for recording or reproducing at least the first and third record signals simultaneously or switchably, the recording and reproducing mechanism being connected operably with the first, second and third record signal generating circuits and including a plurality of magnetic heads mounted on a rotary drum; a first reproducing circuit for restoring the input analog video signal from the first record signal reproduced by the recording and reproducing mechanism; a second reproducing circuit for restoring the input analog audio signal from the second record signal reproduced by the recording and reproducing mechanism; and a third reproducing circuit for restoring the video and audio information from the third record signal. In a first embodiment of the present invention, the input compressed analog signal is recorded by multi-track recording on the magnetic tape by a plurality of pairs of magnetic heads and, at the same time, the input compressed digital signal is recorded superposed on the input audio signal on the audio track on the magnetic tape by a pair of magnetic heads. In another embodiment, a desired one of the input analog video signal and the input compressed digital signal is recorded switchably on the magnetic tape by the same magnetic heads.

In yet another embodiment of the present invention, there are provided a plurality of pairs of magnetic heads for multi-track recording, on a plurality of video tracks of the recording tape, record signals obtained by modulating multiplexed signals formed by multiplexing the luminance signal and the carrier chrominance signal of an analog wideband video signal which each have previously been divided into a plurality of channels; and a first pair of magnetic heads for sequentially recording, on the audio track independent of the plurality of video tracks, a composite signal formed by mixing the frequency-modulated L- and R-channel audio signals with the QPSK-modulated PCM-channel audio signal.

In a further embodiment of the present invention, the recording and reproducing apparatus is so arranged as to sequentially record, on a plurality of video tracks, by the plurality of magnetic heads used to record the analog wide-band video signal, the record signals formed by dividing the digital signals into blocks with correction codes added thereto and then modulating the digital signals into the record signals, and further includes a circuit for changing over the video signal between the analog signal and the digital signal for recording.

In a further embodiment of the present invention, there are provided a second pair of magnetic heads having an azimuth angle different from that of the above-mentioned first pair of magnetic heads for recording, superposed over the audio signal, on the audio track, an analog signal formed by down-converting a wide-band video signal and mixing the down-converted and frequency-modulated luminance signal with the chrominance signal down-converted and further converted to a low frequency band.

In a further embodiment of the present invention, there is provided a decision circuit for deciding whether the signal recorded on the plurality of video tracks is analog or digital by using the reproduced signal from the audio track by the second pair of magnetic heads.

The analog wide-band video signal or the code-compressed digital video and audio signals are respectively compressed in bandwidth and recorded on a plurality of tracks. Therefore, regardless of whether the video signal to be recorded is analog or digital, the video signal can be recorded on the same recording medium by switching between the analog wide-band signal and compressed digital video and audio signals.

In addition, since the decision circuit is provided for deciding whether the recorded signal is analog or digital, switching between analog signal and digital signal can be made easily in reproduction.

Further, by recording the digital track on two video tracks and, at the same time, recording the analog wide-band video signal, which has been down-converted, on the audio track as an analog signal, variable speed reproduction can be achieved easily by reproducing and displaying the analog signal in high speed reproduction.

In a still additional embodiment of the present invention, a recording circuit of the rotary head type magnetic recording and reproducing apparatus is configured such that there are provided first and second groups of magnetic heads on a rotary drum on which a magnetic tape run around the circumference thereof with a wrap angle of about 180°. The first group of heads are for scanning two tracks of the magnetic tape simultaneously at a time; the second group of heads are for scanning a track different from the above-mentioned two tracks on the magnetic tape. The recording circuit further has a first circuit for converting the input analog wide-band video signal into video signals of two channels of a narrow frequency band and supplying the signals to the first group of heads, a second circuit for processing the input audio signals to produce record signals, and supplying the record signals to the second group of heads, and a third circuit for processing the input compressed digital signal to produce signals of a frequency band different from that of the audio signal processed by the second circuit, and supplying the signals to the second group of heads.

In the last mentioned embodiment of the present invention, the rotary head type magnetic recording and 5 reproducing apparatus is further provided with a third group of heads arranged at a position different from the positions of the first and second groups of heads; a circuit for frequency-modulating the luminance signal of the input analog narrow-band video signal, converting the carrier chrominance signal to a low frequency band, and supplying a composite signal of the frequency-modulated luminance signal and the low-frequency-converted carrier chrominance signal to the third group of heads to record the composite signal on the magnetic tape, and a circuit for separating the signal reproduced from the magnetic tape by the third group of heads into a frequency-modulated luminance signal and a low-frequency-band-converted carrier chrominance signal and demodulating the frequency-modulated luminance signal into a baseband luminance signal, while converting the low-frequency-converted carrier chrominance signal to a high frequency band, thus producing an analog narrow-band video signal. With the arrangement, the analog wide-band video signal is converted into two video signals of a frequency band recordable on the magnetic tape. Those video signals are recorded on the magnetic tape simultaneously. Thus, it is possible to record the analog wide-band video signal on the magnetic tape. Since the audio signal is recorded on tracks different from the tracks for the analog wide-band video signal, crosstalk between the audio and video signals can be avoided. Though the compressed digital signal is recorded on the same track as the audio signal, because the audio signal is recorded in the deep-layer portion of the tape and the compressed digital signal is recorded in the shallow-layer portion of the tape, crosstalk among the compressed digital signal, the analog wide-band video signal and the audio signal can be prevented.

The analog narrow-band video signal, such as the current analog video signal, is recorded and reproduced by the same recording process as the conventional VTR, and therefore, in this respect, the recording and reproducing apparatus according to the present invention has compatibility with the conventional VTR.

With the current analog VTR for household use, it is difficult to achieve variable speed reproduction, such as high speed reproduction by using the compressed digital signal because in the case of the compressed digital signal, the amount of data for each moment of unit display, such as frame, is not constant.

Therefore, even when the compressed digital signal has been recorded, it is desirable to easily perform trick plays, such as high speed reproduction or variable speed reproduction. To achieve them, in an embodiment of the present invention, the magnetic recording and reproducing apparatus is provided with a circuit for changing over between normal speed reproduction and variable speed reproduction, and in normal speed reproduction, it reproduces the digital signal from a plurality of video tracks, while on the other hand, in variable speed reproduction, it can reproduce the analog signal, recorded superposed over the audio signal, from the audio track.

In the case of household magnetic recording and reproducing apparatuses for recording video and audio signals, it is preferable to have a function to record and reproduce an analog wide-band video signal and a highly-efficicent-encoded compressed digital signal in digital television broadcasting in addition to having compatibility with the current system analog VTR.

Therefore, in an embodiment of the present invention, the rotary head magnetic recording and reproducing apparatus is provided with a pair of magnetic heads for sequentially recording on the magnetic tape a composite signal formed by mixing the frequency-modulated luminance signal of an analog video signal and the low-frequency-converted carrier chrominance signal of the analog signal.

BRIEF DESCRIPTION OF THE DRAWINGS

FIG. 20 is a block diagram showing the principal parts of yet additional embodiment of the rotary head type magnetic recording and reproducing apparatus according to the present invention;

FIG. 21 is a diagram showing an illustrative example of the frequency spectrum of the compressed digital signal in the embodiment shown in FIG. 20;

DESCRIPTION OF THE PREFERRED EMBODIMENTS

Embodiments of the present invention will be described with reference to the accompanying drawings.

Figure 1:
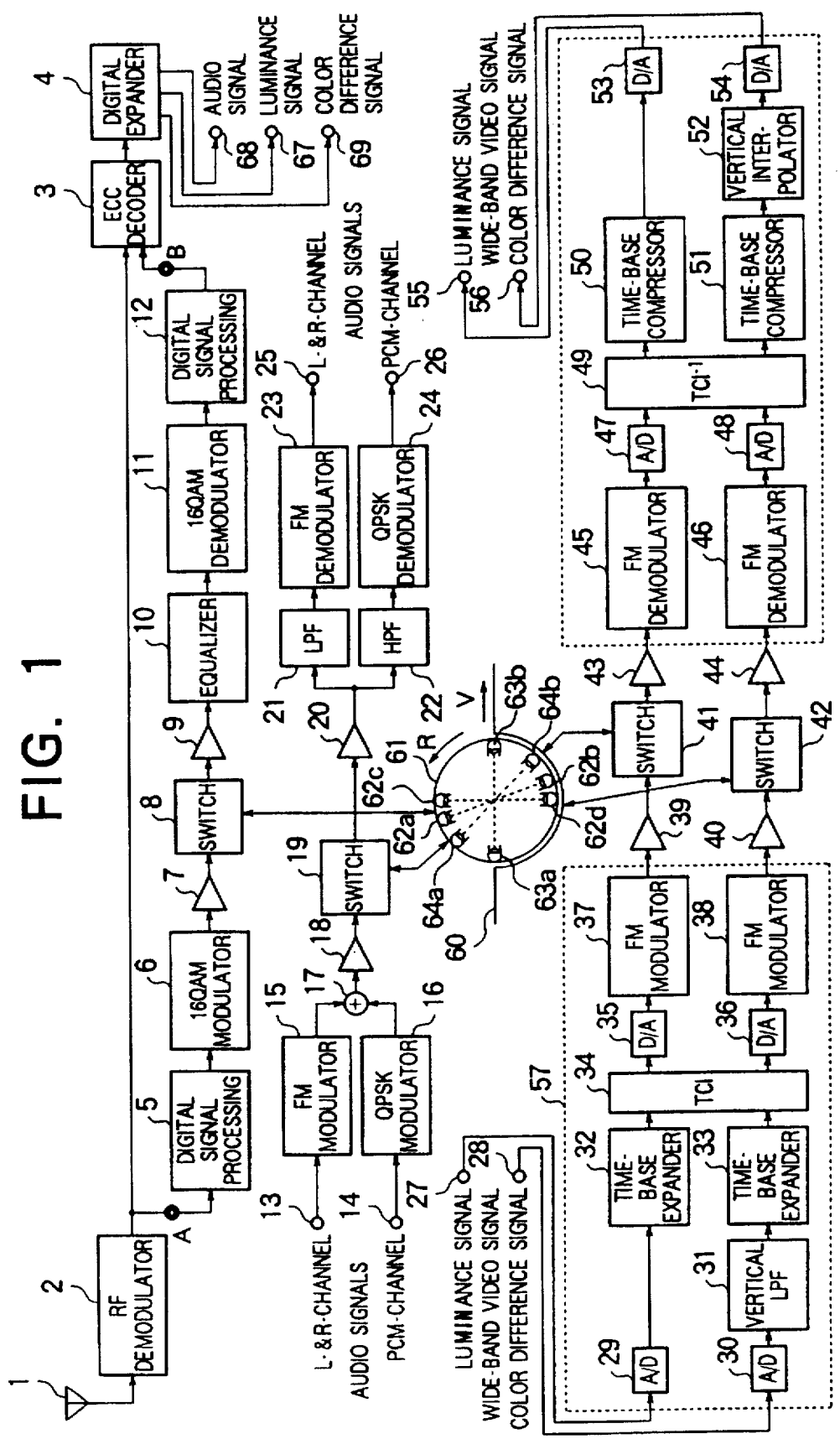
FIG. 1 is a block diagram showing an embodiment of the rotary head type magnetic recording and reproducing apparatus according to the present invention.

FIG. 1 is a block diagram showing an embodiment of the rotary head type magnetic recording and reproducing apparatus according to the present invention. Reference numeral 1 denotes an antenna, 2 denotes an RF demodulator, 3 denotes an error correction decoder, 4 denotes a digital expansion processing circuit, 5 denotes a recording system digital signal processing circuit, 6 denotes a 16 QAM modulator, 7 denotes a recording amplifier, 8 denotes a recording/reproduction change-over switch, 9 denotes a reproduction amplifier, 10 denotes an equalizer, 11 denotes a 16 QAM demodulator, 12 denotes a reproduction system digital signal processing circuit, 13 and 14 denote input terminals, 15 denotes an FM modulator, 16 denotes a QPSK modulator, 17 denotes an adder, 18 denotes a recording amplifier, 19 denotes a recording/reproduction change-over switch, 20 denotes a reproduction amplifier, 21 denotes an LPF (low-pass filter), 22 denotes a HPF (high-pass filter), 23 denotes an FM demodulator, 24 denotes a QPSK demodulator, 25 and 26 denote output terminals, 27 and 28 denote input terminals, 29 and 30 denote A/D converters, 31 denotes a vertical LPF, 32 and 33 denote a time-base expanders, 34 denotes a TCI (time-domain multiplexed signal) encoder, 35 and 36 denote D/A converters, 37 and 38 denote FM modulators, 57 denotes a recording system analog signal processing circuit, 39 and 40 denote recording amplifiers, 41 and 42 denote recording/reproduction change-over switch, 43 and 44 denote reproduction amplifiers, 45 and 46 denote FM demodulators, 47 and 48 denote A/D converters, 49 denotes a TCI decoder, 50 and 51 denote time-base compressors, 52 denotes a vertical interpolator, 53 and 54 denote D/A converters, 58 denotes a reproduction system analog signal processing circuit, 55 to 59 denote output terminals, 60 denotes a magnetic tape, 61 denotes a rotary drum, and 62a to 62d, 63a, 63b, 64a, 64b denote magnetic heads. Note that "TCI" is the abbreviation of Time Compressed Integration.

In FIG. 1, a reception processing system for the digital broadcast signal is formed by the antenna 1 for receiving compressed digital data in digital broadcasting, for example, the RF demodulator 2, the error correction decoder, and the digital expansion processing circuit 4. A recording and reproduction system for the compressed digital signal is formed by the recording system digital signal processing circuit 5, the 16 QAM modulator 6, the recording amplifier 7, the recording/reproduction change-over switch 8, the reproduction amplifier 9, the equalizer 10, the 16 QAM demodulator 11 and the reproduction system digital signal processing circuit 12. A recording and reproduction system for the audio signal is formed by the FM modulator 15, the QPSK modulator 16, the adder 17, the recording amplifier 18, the recording/reproduction change-over switch 19, the reproduction amplifier 20, the LPF 21, the HPF 22, the FM demodulator 23 and the QPSK demodulator 24. A recording and reproduction system for the analog wide-band video signal is formed by the A/D converters 29 and 30, vertical LPF 31, the time-base expanders 32 and 33, the TCI encoder 34, the D/A converters 35 and 36, the FM modulators 37 and 38, the recording system analog signal processing circuit 57, the recording amplifiers 39 and 40, the recording/reproduction change-over switches 41 and 42, the reproduction amplifiers 43 and 44, the FM demodulators 45 and 46, the A/D converters 47 and 48, the TCI decoder 49, the time-base compressors 50 and 51, the vertical interpolator 52, the D/A converters 53 and 4, and the reproduction system analog signal processing circuit 58.

Note that the division of the circuit configuration in FIG. 1 is not limited to those mentioned above, but the following division is possible. For example, a circuit for generating a record signal from the compressed digital signal may be formed by the components 1, 2, 5 and 6, a circuit for generating a record signal from the analog audio signal may be formed by the components 15 to 17, a circuit for generating a record signal from the analog wide-band video signal may be formed by the components 29 to 38, a mechanism for recording and reproducing record signals on a magnetic tape 60 may be formed by the components 7 to 9, 18 to 20, 39 to 44, 61, 62a, 62b, 62c, 63a, 63b, 64a, and 64b, a circuit for restoring the video signal (namely, the luminance signal and the color difference signal) and the audio signal included in the input compressed digital signal from the reproduced signal from the recording and reproduction mechanism device may be formed by the components 3, 4, 10 to 12, a circuit for restoring the audio signal from the reproduced signal from the recording and reproduction device may be formed by the components 21 to 24, and a circuit for restoring the input analog wide-band video signal from the recording and reproduction device may be formed by the components 45 to 54. The circuit configuration in FIG. 1 will be described according to the division mentioned in the first place, but it should be understood that this description is substantially applicable to the latter division.

To begin with, the recording system for the analog wide-band video signal will be described.

A luminance signal in the analog wide-band video signal is input from the input terminal 27, and two color difference signals of the analog wide-band video signal is input from the input terminal 28. The luminance signal is digitized by the A/D converter 29, and as the sampling frequency is reduced by the time-base expander 32, the time base of the luminance signal is expanded, that is, the horizontal picture size is expanded, and the luminance signal is thereby divided into two signals. On the other hand, the two color difference signals are digitized by the A/D converter 30, are thinned out by the vertical LPF 31 so that the vertical picture size is reduced to ½, and as the sampling frequency is reduced by the time-base expander 33, the time base is expanded, that is, the horizontal picture size is expanded.

The two divided luminance signals whose time-base has been expanded and the two color difference signals whose time base has been expanded are supplied to the TCI encoder 34, which produces TCI signals by compressing their time base and multiplexing the color difference signals in the horizontal blanking periods of the respective luminance signals. Those TCI signals are supplied respectively to the D/A converters 35 and 36 and are here converted into analog form, and the analog TCI signals are then frequency-modulated by the FM modulators 37 and 38 into the record signals.

Figure 2A:
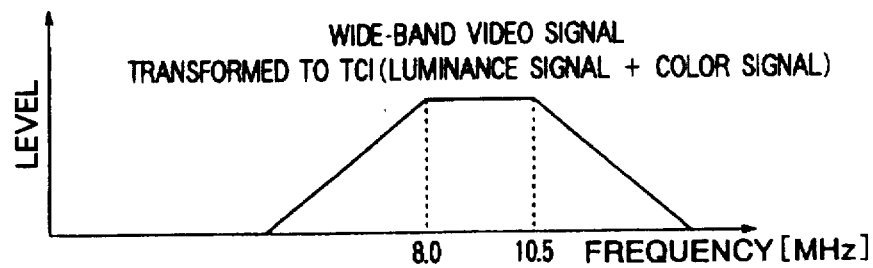
FIGS. 2A, 2B and 2C are diagrams showing illustrative examples of frequency spectra of the analog wide-band video signal, audio signal and compressed digital signal in the embodiment shown in FIG. 1.

FIG. 2A is a spectral diagram showing an example of a record signal such as is mentioned above. The FM carrier frequency of the record signal in this case is 8.0 to 10.5 MHz.

The record signals output from the FM modulators 37 and 38 are amplified by the recording amplifiers 39 and 40, then supplied through the recording/reproduction change-over switches 41 and 42 to the magnetic heads 62a, 62b, 62c and 62d to record those signals on the magnetic tape 60.

The magnetic heads 62a, 62b, 62c and 62d are mounted on the rotary drum 61 rotating in the direction of the arrow R, the magnetic heads 62a, 62b are positioned 180° opposite to each other, and the magnetic heads 62c, 62d are also positioned 180° opposite to each other. The magnetic heads 62a, 62c are close to each other, and the magnetic heads 62b, 62d are close to each other. The record signal from the recording amplifier 39 is supplied to the magnetic heads 62a, 62b, while the record signal from the recording amplifier 40 is supplied to the magnetic heads 62c, 62d. The magnetic tape 60 is made to wrap the rotary drum 61 for about 180° of the circumference thereof and runs in the direction of the arrow V.

Description will next be made of the recording system for the audio signal.

Figure 2B:

The audio signals of the L- and R-channels are input from the input terminal 13, while the audio signal of the PCM channel is input from the input terminal 14. The audio signals of the L- and R-channels are frequency-modulated by the FM modulator 15, the audio signal of the PCM channel is QPSK-modulated by the QPSK modulator 16, and the two audio signals are added together by the adder 17. FIG. 2B shows the frequency spectrum of those modulated audio signals, wherein 1.3 MHz is the FM carrier frequency of the frequency-modulated audio signal of the L-channel, 1.7 MHz is the FM carrier frequency of the audio signal of the R-channel, and 3.0 MHz is the carrier frequency of the QPSK-modulated audio signal of the PCM channel. The output audio signal of the adder 17 is amplified by the recording amplifier 18, then supplied through the recording/reproduction change-over switch 19 to the magnetic heads 63a, 63b, and recorded on the magnetic tape 60.

The magnetic heads 63a, 63b are positioned 180° opposite to each other on the rotary drum 61.

Description will now be made of the reception processing system for the digital broadcasting signal.

The compressed digital signal broadcasted by digital broadcasting is received by the antenna 1, demodulated to a baseband signal by the RF demodulator 2, then supplied to the error correction decoder 3 where the signal is subjected to a process for correcting or amending errors which occurred in the transmission system. The output signal of the error correction decoder 3 is supplied to the digital expansion processing circuit 4 to be restored to the video signal and the audio signal, and the luminance signal of the video signal is output from the output terminal 67, the color difference signals of the video signal are output from the output terminal 69, and the audio signal is output from the output terminal 68.

The recording system for the compressed digital signal will be described in the following.

The compressed digital signal which has been RF-demodulated to a baseband signal, is also supplied to the recording system for the compressed digital signal. In the recording system for the compressed digital signal, the recording system digital signal processing circuit 5 performs formatting processes, such as interleaving, on the compressed digital signal and adds error correction codes for use in the recording system and header information, such as synchronizing signals. For example, in the digital broadcast AD-HDTV system proposed by ATRC in the U.S., the analog wide-band video signal is compressed down to 24 Mbps by efficient coding and used for broadcasting. The compressed digital signal as mentioned above, is processed by the recording system digital signal processing circuit 5 so that the data rate is raised from 24 Mbps to about 30 Mbps.

Figure 2C:
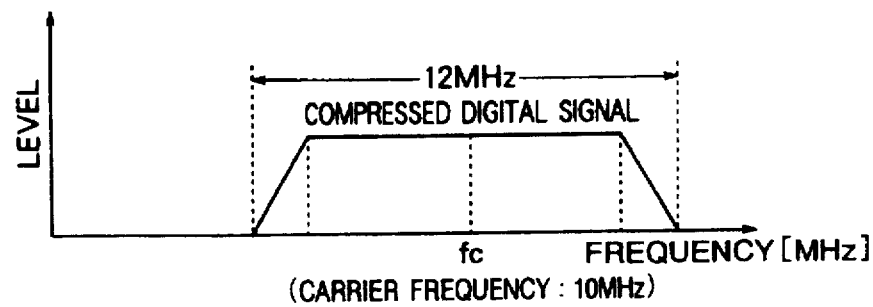

The compressed digital signal output from the recording system digital signal processing circuit 6 is modulated through the 16-value quadrature amplitude modulation (16 QAM) by the 16 QAM modulator 6. Therefore, the output signal of the 16 QAM modulator 6, as shown in FIG. 2C, becomes a signal of a frequency band not included in the frequency band of the audio signals shown in FIG. 2B. With recording at 50% roll off taken into consideration, the compressed digital signal is modulated to a frequency band of 12 MHz. The fc in FIG. 2C stands for the carrier frequency of compressed digital data modulated by 16 QAM modulation.

The compressed digital signal output from the 16 QAM modulator 6 is amplified by the recording amplifier 7, then supplied through the recording/reproduction change-over switch 8 to the magnetic heads 64a, 64b, and recorded on the magnetic tape 60. Those magnetic heads 64a, 64b are positioned 180° opposite to each other on the rotary drum 61.

As described above, the magnetic heads 62a to 62d are the heads for recording and reproducing the analog wide-band video signal, the magnetic heads 63a, 63b are the heads for recording and reproducing the audio signal, and the magnetic heads 64a, 64b are the heads for recording and reproducing the compressed digital signal.

Figure 3:
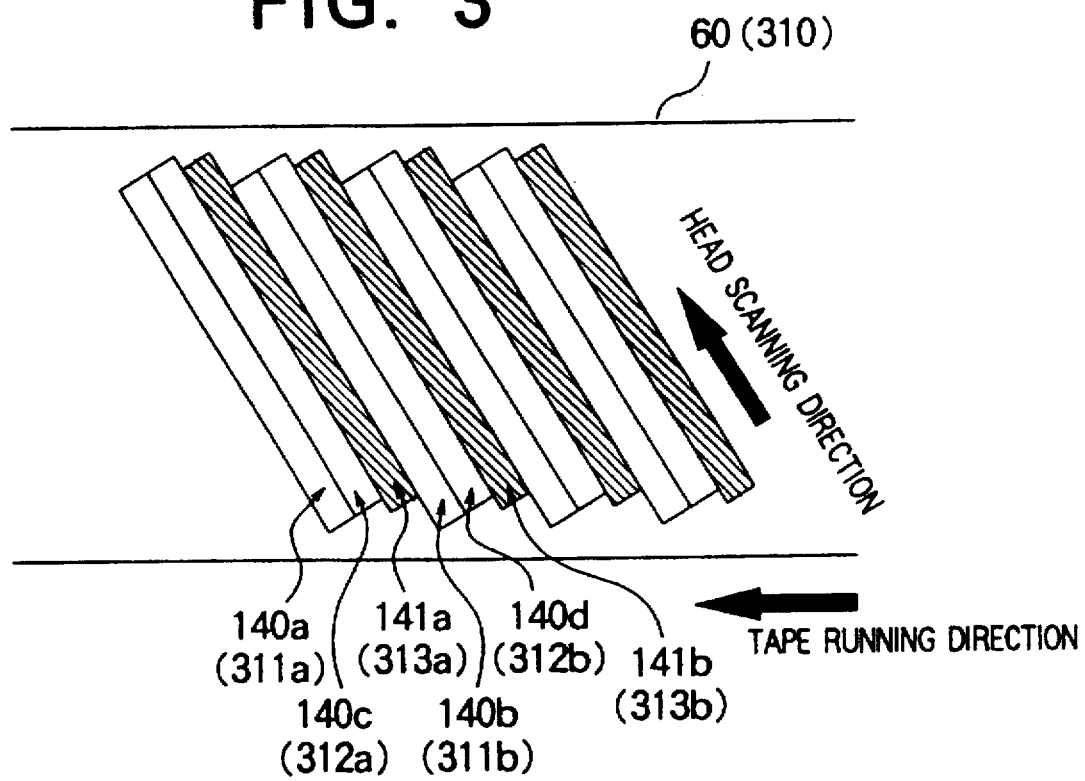
FIG. 3 is a diagram showing an illustrative example of the track pattern on the magnetic tape in the embodiment shown in FIGS. 1 and 19.
Figure 19:
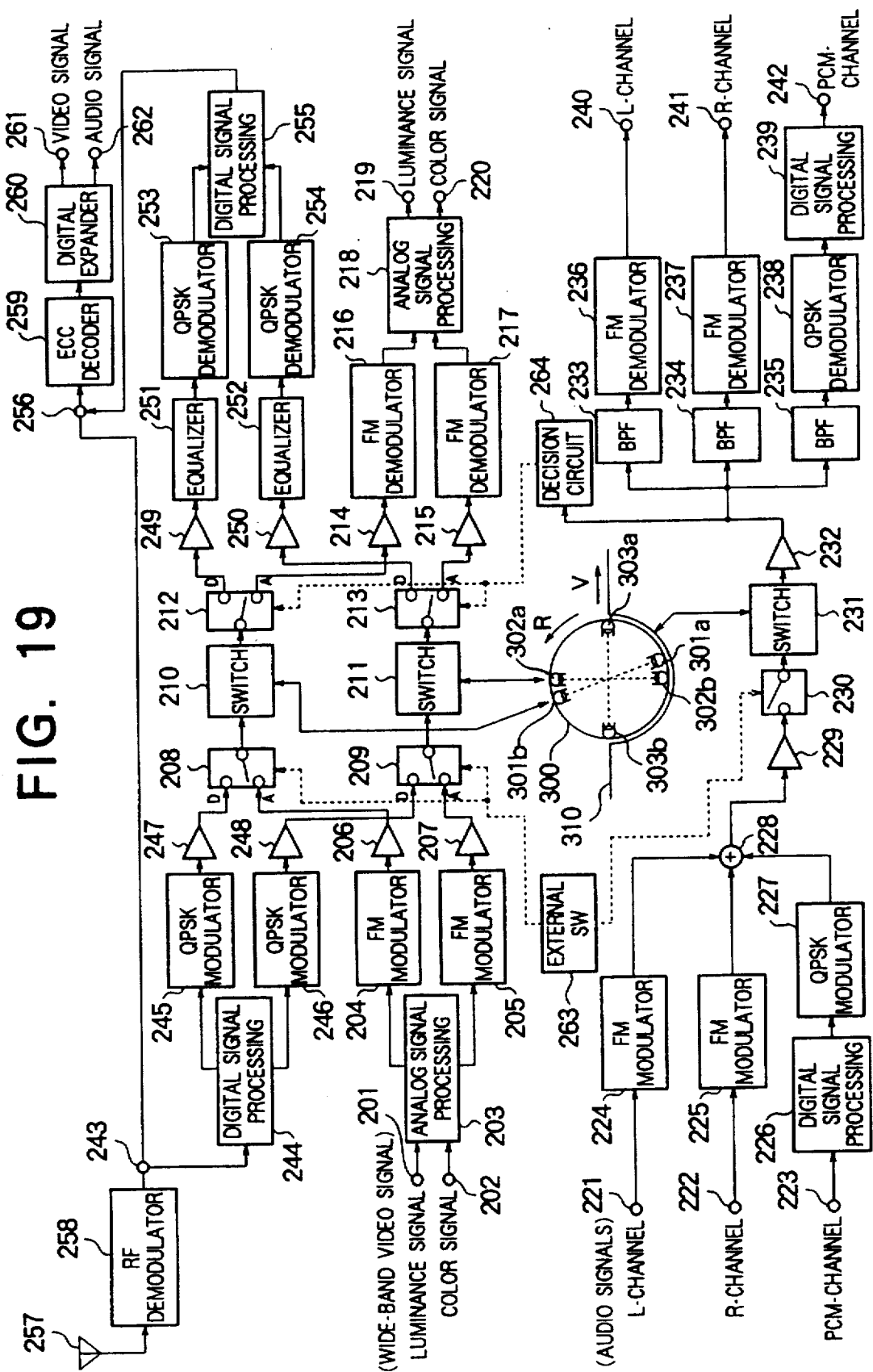
FIG. 19 is block diagram showing yet another embodiment of the rotary head type magnetic recording and reproducing apparatus according to the present invention.

FIG. 3 shows the track patterns formed on the magnetic tape 60 by the recording operation mentioned above. The reference numerals in parentheses are used when the embodiment in FIG. 19 is described later.

In FIG. 3, in one-half rotation of the rotary drum 61, the magnetic heads 62a, 62c perform recording simultaneously, and in the next one-half rotation of the rotary drum 61, the magnetic heads 62b, 62d perform recording. Suppose that tracks 140a, 140c are formed by the magnetic heads 62a, 62c, then it follows that tracks 140b, 140d are formed by the magnetic heads 62b, 62d. On these tracks, analog wide-band video signals of two channels are recorded.

The magnetic heads 63a, 63b and the magnetic heads 64a, 64b are used to form tracks between the tracks formed by the magnetic heads 62a, 62c and the magnetic heads 62b, 62d. They are the tracks 141a and 141b. It ought to be noted that the audio signal is recorded by the magnetic heads 63a, 63b into the deep-layer portion of the tape at the tracks 141a, 141b, while the compressed digital signal is recorded into the shallow-layer portion at these tracks 141a, 141b. To be more specific, the magnetic head 64a records the compressed digital signal over the track already formed by the magnetic head 63a, while the magnetic head 64b records the compressed digital signal over the track already formed by the magnetic head 63b. Therefore, the analog wide-band video signal, the audio signal and the compressed digital signal can be recorded and reproduced at the same time.

Figure 9:
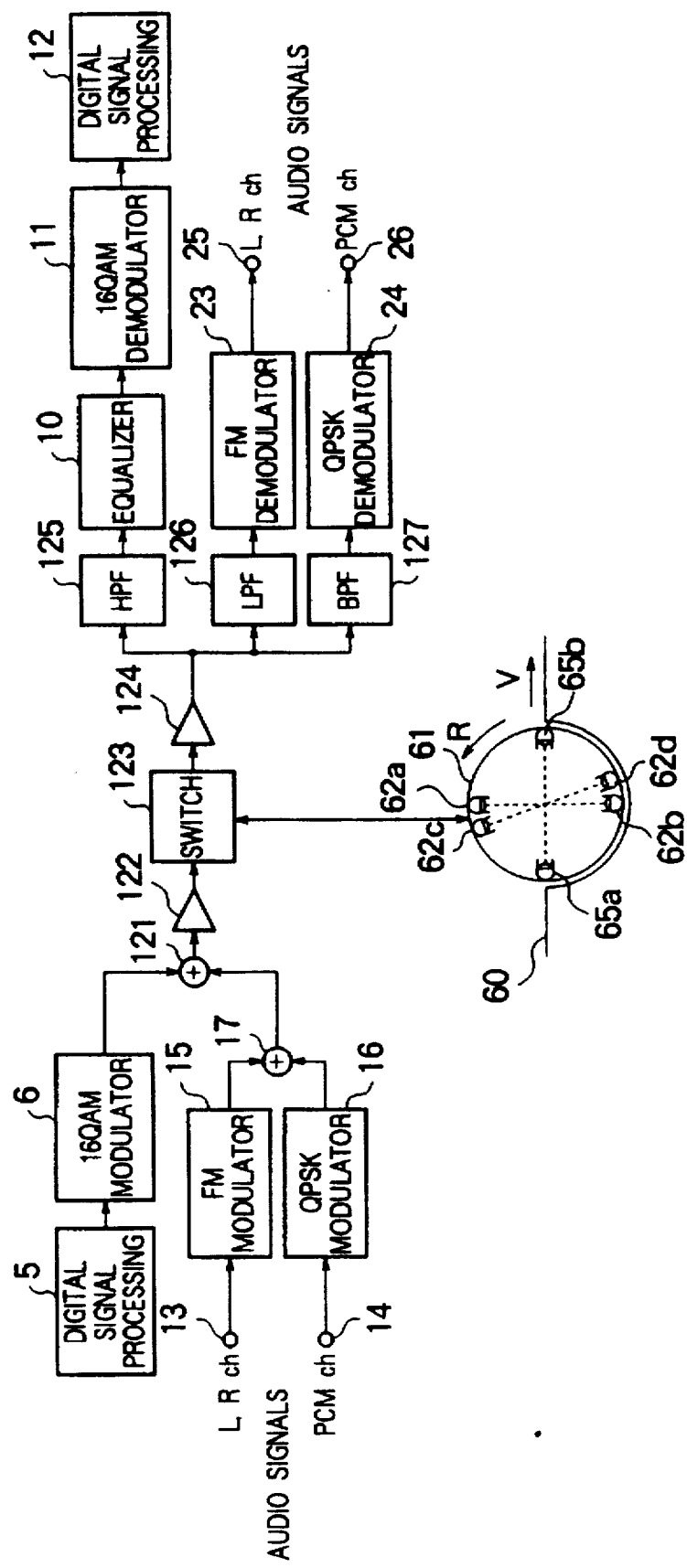
FIG. 9 is a block diagram showing yet another embodiment of the rotary head type magnetic recording and reproducing apparatus according to the present invention.

The reproducing operation will be described with reference to FIG. 3. FIG. 3 shows the track patterns formed by the magnetic heads 62a–62d, 63a, 63b, 64a, 64b. The reference numerals in the parentheses are used when the embodiment in FIG. 9 is described later.

In reproduction, the magnetic heads 62a, 62c scan simultaneously the tracks 140a, 140c on the magnetic tape 60 in FIG. 3 to reproduce the signals, and the magnetic heads 62b, 62d scan simultaneously the tracks 140b, 140d to reproduce the signals. The magnetic heads 63a, 63b and the magnetic heads 64a, 64b respectively scan the tracks 141a, 141b on the magnetic tape 60 to reproduce the signals.

The analog wide-band video signals of two channels reproduced from the magnetic tape 60 by the magnetic heads 62a–62d separately pass through the recording/reproduction change-over switches 41, 42, are amplified by the reproduction amplifiers 43, 44, demodulated by the FM demodulators 45, 46, digitized by the A/D converters 47, 48, and separated by the TCI decoder 49 into the luminance signal and the two color difference signals. The separated luminance signal is reverse-converted to the luminance signal having the original time base by being compressed in horizontal picture size by the time-base compressor 50 so that the sampling frequency is high, and the reverse-converted luminance signal is then converted by the D/A converter 53 into an analog luminance signal, and output from the output terminal 55. The two color difference signals separated from the luminance signal are reverse-converted into color difference signals having the original time base by being compressed in horizontal picture size by the time-base compressor 50 so that the sampling frequency is high, and the color difference signals are converted into analog form and output from the output terminal 56.

The audio signals reproduced from the deep-layer portion of the magnetic tape 60 by the magnetic heads 63a, 63b pass through the recording/reproduction change-over switch 19, are amplified by the reproduction amplifier 20, and fed to the LPF 21 and HPF 22 so that the amplified audio signals are separated into the frequency-modulated audio signals of the L- and R-channels and the QPSK-modulated audio signal, respectively. The frequency-modulated audio signals are demodulated by the FM demodulator 23 to obtain the audio signals of the L- and R-channels which are output from the output terminal 25. The QPSK-modulated audio signal is demodulated by the QPSK demodulator 24 to obtain the audio signal of the PCM channel which is output from the output terminal 26.

On the other hand, the compressed digital signal reproduced from the shallow-layer portion of the magnetic tape 60 by the magnetic heads 64a, 64b go through the recording/reproduction change-over switch 8, is amplified by the reproduction amplifier 9, and waveform-equalized by the equalizer 10. The compressed digital signal output from the equalizer 10 is demodulated by the 16 QAM demodulator 11, then reverse-converted to the RF-demodulated original compressed digital signal by the reproducing system digital signal processing circuit 12, and supplied to the error correction decoder 3.

Figure 4:
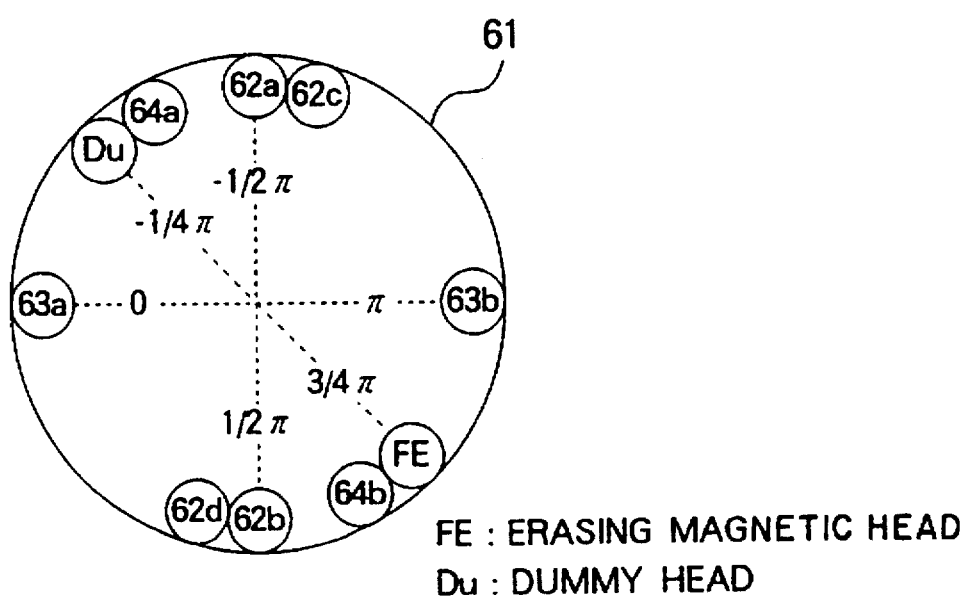
FIG. 4 is a diagram showing an illustrative example of the arrangement of the magnetic heads on the rotary drum in the embodiment shown in FIG. 1.

FIG. 4 is a diagram showing an example of arrangement of the magnetic heads on the rotary drum 61.

If it is assumed that one magnetic head 63a for recording and reproducing the audio signal is set at the reference position of 0 radian, the other magnetic head 63b for recording and reproducing the audio signal is mounted at a position π radians shifted from the reference position, the erasing magnetic head FE is located at a position ¾π shifted from the reference position, one magnetic head 64b for recording and reproducing the compressed digital data is located at a position close to the magnetic head FE, a dummy head Du to secure the balance of the rotary drum 61 is placed at a position −¼π radian shifted from the reference position (in other words, 180° opposite to the erasing magnetic head FE), and the other magnetic head 64a for recording and reproducing the compressed digital data is located at a position close to the dummy head Du. Two magnetic heads 62a, 62c for recording and reproducing the analog wide-band video signal are located at positions shifted −½π radians from the reference position, and the other two magnetic heads 62b, 62d for recording and reproducing the analog wide-band video signal are located shifted ½π radians from the reference position, that is, 180° opposite to the magnetic heads 62a, 62c.

In this embodiment, the analog wide-band video signal is divided into two TCI signals which are then modulated by frequency modulation to a carrier band free from spectral components of the audio signal modulated in a low frequency band. The TCI signals are recorded at tracks separate from the tracks for the audio signal in order to avoid crosstalk between the analog wide-band video signal and the audio signal.

By using the 16 QAM modulation method capable of recording and reproducing the compressed digital signal in a narrow band and also capable of maintaining the narrowness of the frequency band even in a nonlinear transmission line, the compressed digital signal is modulated to a carrier band free from spectral components of the audio signal and recorded in a shallow-layer portion of the tape over the audio signal recorded on the same track in a deep-layer portion of the tape. Therefore, it is possible to preclude crosstalk between the compressed digital signal and the audio signal.

Further, since it is possible to set the azimuth angles for the magnetic heads 64a, 64b for recording and reproducing the compressed digital signal, the magnetic heads 62a to 62d for the analog and reproducing the analog wide-band video signal, and the magnetic heads 63a, 63b for recording and reproducing the audio signal, the crosstalk with the adjacent tracks can be reduced to levels causing substantially no problem.

In this embodiment, as the method for modulating the compressed digital signal, the 16 QAM modulation is used, but this is not the only possible modulating method. For example, the modulating method for a narrower band, such as the 32-value quadrature amplitude modulation (32 QAM) may be used to further increase the amount of information to be recorded.

Further, in this embodiment, by providing interfaces at the points A and B in FIG. 1, the antenna 1, the RF demodulator 2, the error correction decoder 3, and the digital expander 4 can be used commonly with a television set for digital broadcasting. This brings about an effect of a reduction of hardware.

Further, in this embodiment, it is assumed that an input analog video signal of a wide band is used, but it is possible to record and reproduce an analog video signal of a narrow band instead of the wide-band analog video signal. In this case, instead of the recording-system and reproducing-system analog signal processing circuits 57 and 58, it is only necessary to use, for example, the recording-system and reproducing-system signal processing circuits for the input analog video signal of a narrow band in the embodiment in FIG. 16, which will be described later.

Figure 5:
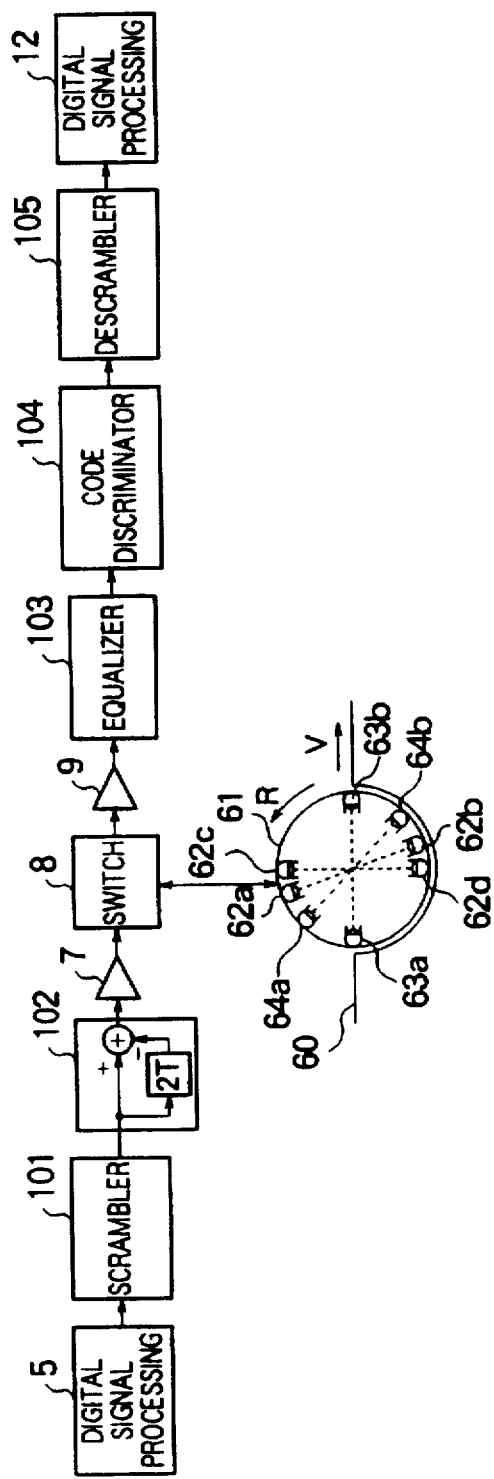
FIG. 5 is a block diagram showing another embodiment of the rotary head type magnetic recording and reproducing apparatus according to the present invention.

FIG. 5 is a block diagram showing the principal portion, that is, the recording and reproducing system for the compressed digital signal in another embodiment of the rotary head type magnetic recording and reproducing apparatus according to the present invention. Reference numeral 101 denotes a scrambler, 102 denotes a (1-D) arithmetic circuit, 103 denotes an equalizer, 104 denotes a code discriminator, 105 denotes a descrambler, and the parts corresponding to the parts in FIG. 1 are designated by the same reference numerals and their descriptions will be omitted.

Figure 6:
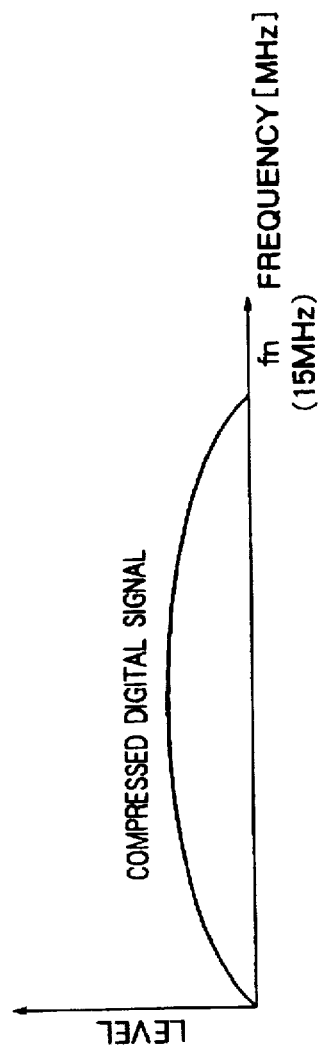
FIG. 6 is a diagram showing an illustrative example of the frequency spectrum of the compressed digital signal in the embodiment shown in FIG. 5.

In FIG. 5, the compressed digital signal formatted by the recording-system digital signal processing circuit 5 and having error correction codes and header information added thereto is randomized by the scrambler 101, and supplied to the (1-D) arithmetic circuit 102. The compressed digital signal is subjected to a partial response process in which the compressed digital signal delayed by 2 bit periods 2T subtracted from the compressed digital signal itself. Consequently, the compressed digital signal output from the (1-D) arithmetic circuit 102 has been converted into a record signal which has no DC components and has the low frequency domain suppressed as shown in FIG. 6. Note that fn (=T) in FIG. 6 is the so-called Nyquist frequency and corresponds to the bit rate frequency. This record signal is amplified by the recording amplifier 7, then supplied to the magnetic heads 64a, 64b through the record/reproduction change-over switch, and recorded on the magnetic tape 60 as in the embodiment shown in FIG. 1.

In reproduction, the compressed digital signal reproduced from the magnetic tape 60 by the magnetic heads 64a, 64b passes through the recording/reproduction change-over switch 8, is amplified by the reproduction amplifier 8, sent to the equalizer 103, and its code is discriminated by the code discriminator 104, and decoded by the descrambler 105. The decoded signal is supplied to the reproduction-system digital signal processing circuit 12, and the original compressed digital signal can be obtained as in the embodiment shown in FIG. 1.

As has been described, in this embodiment, the present invention is applied not to carrier modulation recording as in the embodiment in FIG. 1, but to baseband recording. The compressed digital signal is converted into a record signal having no DC components and having the spectral components in the frequency domain corresponding to the low frequency domain of the audio signal suppressed by the scrambler 101 and the (1-D) arithmetic circuit 102, and is recorded in the shallow-layer portion of the tape over the audio signal recorded on the same tracks, so that like in the embodiment in FIG. 1, crosstalk between the audio signal and the compressed digital signal can be precluded.

Figure 7:
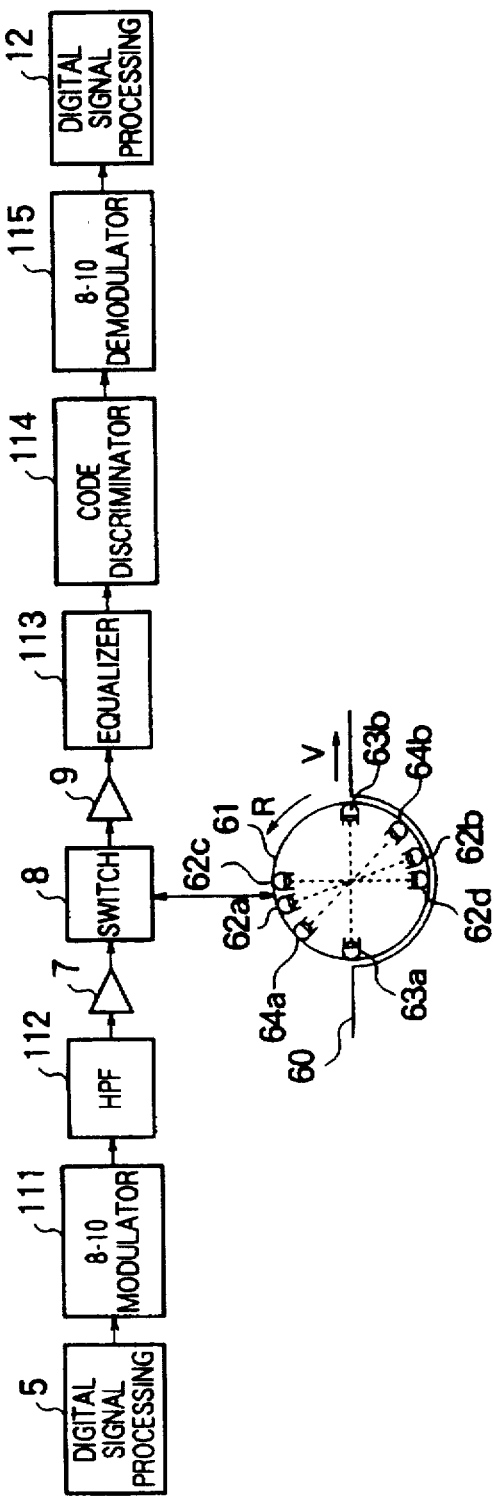
FIG. 7 is a block diagram showing a further embodiment of the rotary head type magnetic recording and reproducing apparatus according to the present invention.

FIG. 7 is a block diagram showing only the principal portion, that is, the recording and reproduction system for the compressed digital signal in a further embodiment of the rotary head type magnetic recording and reproducing apparatus according to the present invention. Reference numeral 111 denotes an 8-10 modulator, 112 denotes an HPF, 113 denotes an equalizer, 114 denotes a code discriminator, 115 denotes an 8-10 demodulator, and the parts corresponding to the parts in FIG. 1 are designated by the same reference numerals and their descriptions will be omitted.

Figure 8:
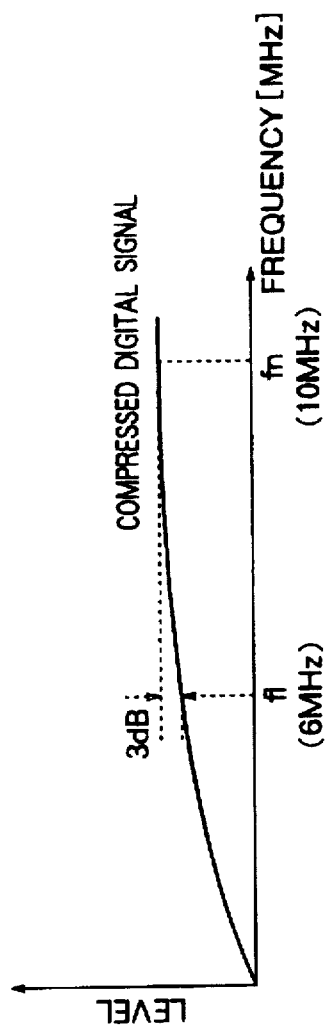
FIG. 8 is a diagram showing an illustrative example of the frequency spectrum of the compressed digital signal in the embodiment shown in FIG. 7.

In FIG. 7, the compressed digital signal formatted by the recording-system digital signal processing circuit 5 and having error correction codes and header information added thereto is converted from every 8 bits into 10-bit codes by the 8-10 modulator. This is what is referred to as DC-free-coded data having the spectrum in the low frequency domain suppressed. The compressed digital signal from the 8-10 modulator has its low frequency domain spectrum further suppressed by the HPF 112, and becomes a record signal having the spectrum of the low frequency domain corresponding to the low frequency domain of the modulated audio signal suppressed sufficiently as shown in FIG. 8. Note that f1 in FIG. 8 is the low cutoff frequency of the HPF 112 and this low cutoff frequency is set at a little higher than the upper limit of the band of the modulated audio signal.

In reproduction, the reproduced compressed digital signal is equalized along with the low cutoff frequency by the HPF 112 in the recording system by the equalizer 113, discriminated by the code discriminator 114, and decoded to the original data in 8-bit arrays.

As has been described, in this embodiment, like in the embodiment of FIG. 6, the present invention is applied to recording of a baseband signal, the compressed digital signal, which has no DC components and the spectral components of the frequency domain corresponding to the low frequency domain of the audio signal suppressed by the 8-10 modulator 111 and HPF 112, is recorded superposed over the audio signal. Like in the embodiments of FIGS. 1 and 6, crosstalk between the audio signal and the compressed digital signal can be avoided.

In the embodiment shown in FIG. 8, as an example of DC-free coding of the compressed digital signal, the 8-10 modulation is used, but this is not the only possible method. For example, the mirror square coding or the 8-14 modulation or the like may be used.

FIG. 9 is a block diagram showing the principal portion, that is, only the recording and reproducing system for the compressed digital signal and the audio signal in a yet another embodiment of the rotary head type recording and reproducing apparatus. Reference numeral 121 denotes an adder, 122 denotes a recording amplifier, 123 denotes a recording/reproduction change-over switch, 124 denotes a reproduction amplifier, 125 denotes an HPF, 126 denotes an LPF, and 127 denotes a BPF, and those parts corresponding to the parts in FIG. 1 are designated by the same reference numerals, and their descriptions will be omitted.

Figure 10:
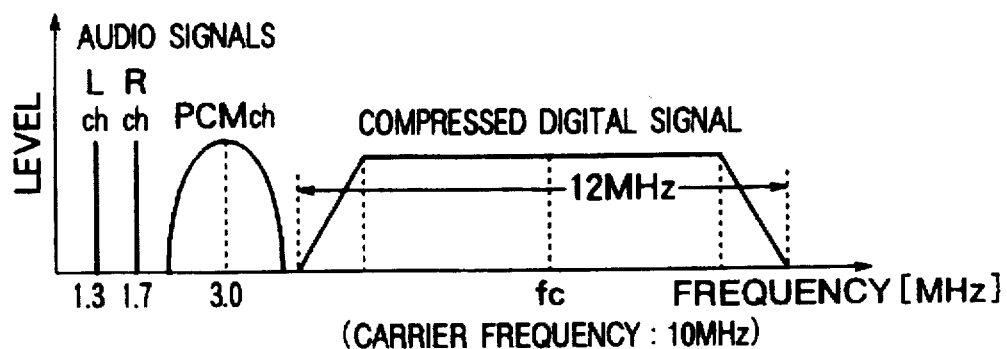
FIG. 10 is a diagram showing illustrative examples of the frequency spectrum of the audio signal and the compressed digital signal in the embodiment shown in FIG. 9.

In FIG. 9, the compressed digital signal formatted by the recording-system digital signal processing circuit 5 and having error correction codes and header information added thereto is modulated using the 16 QAM modulation method by the 16 QAM modulator 6. The audio signals of the L- and R-channels input from the input terminal 13 are modulated by the FM modulator 15, while the audio signal of the PCM channel input from the input terminal 14 is modulated by the QPSK modulator 16, and those audio signals are added together by the adder 17. The modulated compressed digital signal and a composite signal of the audio signals are added together by the adder 121. FIG. 10 shows an example of which the carrier frequencies of the 16 QAM modulator 6, the FM modulator 15 and the QPSK modulator 16 are set so that the FM compressed digital signal is placed on the high frequency band side, while the composite audio signal is arranged on the low frequency band side. The composite signal output from the adder 21 is amplified, then supplied through the recording/reproduction change-over switch 123 to magnetic heads 65a, 65b, and recorded on the magnetic tape 60.

The magnetic heads 65a, 65b are the heads for recording, reproducing the composite signal including the compressed digital signal and the audio signal. As shown in FIG. 3, the magnetic heads 65a, 65b alternately and independently form the tracks 141a and 141b between a group of tracks formed by the magnetic heads 62a, 62c and a group of tracks formed by the magnetic heads 62b, 62d, so that the tracks 141a and 141b each hold the record of the composite signal of the compressed digital signal and the audio signal. Therefore, like in the embodiment in FIG. 1, it is possible to record or reproduce the analog wide-band video signal, the audio signals and the compressed digital signal at the same time.

In reproduction, the composite signal reproduced from the magnetic tape 60 by the magnetic heads 65a, 65b is sent through the recording/reproduction change-over switch 123 to the reproduction amplifier 124 so as to be amplified by the reproduction amplifier 124. The FM compressed digital signal is separated out by the HPF 125, the FM audio signal is separated out by the LPF 126, and the QPSK audio signal is separated out by the BPF 127. The FM compressed digital signal is successively processed by the equalizer 10, the 16 QAM modulator 11 and the reproducing-system digital signal processing circuit 12, and is reproduced as the original compressed signal like in the embodiment in FIG. 1. The FM audio signal is demodulated by the FM demodulator 23, and output as the L- and R-channel audio signals from the output terminal 25. The QPSK audio signal is demodulated by the QPSK demodulator 24, and output as the PCM-channel audio signal from the output terminal 26.

Figure 11:
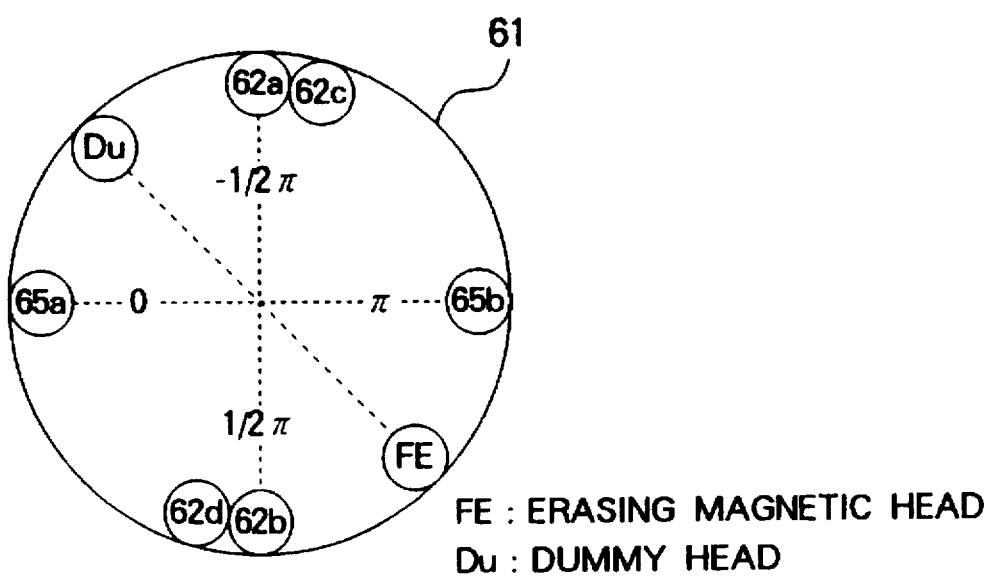
FIG. 11 is a diagram showing an illustrative example of the arrangement of the magnetic heads on the rotary drum in the example shown in FIG. 9.

FIG. 11 is a diagram showing an example of arrangement of the magnetic heads on the rotary drum 61 in FIG. If it is assumed that one of the magnetic heads 65a for recording and reproducing the composite signal of the audio signal and the compressed digital signal, for example, 65a, is set at the zero position and this zero position is the reference position of 0 radian, the other magnetic head 65b for recording and reproducing the composite signal of the audio signal and the compressed digital signal is located at a position shifted π radians from the reference position, two magnetic heads 62a, 62c for recording and reproducing the analog wide-band video signal are located shifted −½π radians from the reference position, and the other two magnetic heads 62b, 62d for recording and reproducing the analog wide-band video signal are located shifted ½π radians from the reference position.

As described above, in this embodiment, the compressed digital signal is modulated at a carrier band free from spectral components of the audio signals and recorded superposed over the audio signal. Therefore, it is possible to avoid crosstalk between the compressed digital signal and the audio signals.

By setting the azimuth angles for the magnetic heads 65a, 65b for recording and reproducing the composite signal of the compressed digital signal and the audio signal and the magnetic heads 62a to 62d for recording and reproducing the analog wide-band video signal in such a way as to produce the azimuth loss effects, the crosstalk with the adjacent tracks can be reduced to a level causing substantially no problem.

Figure 12:
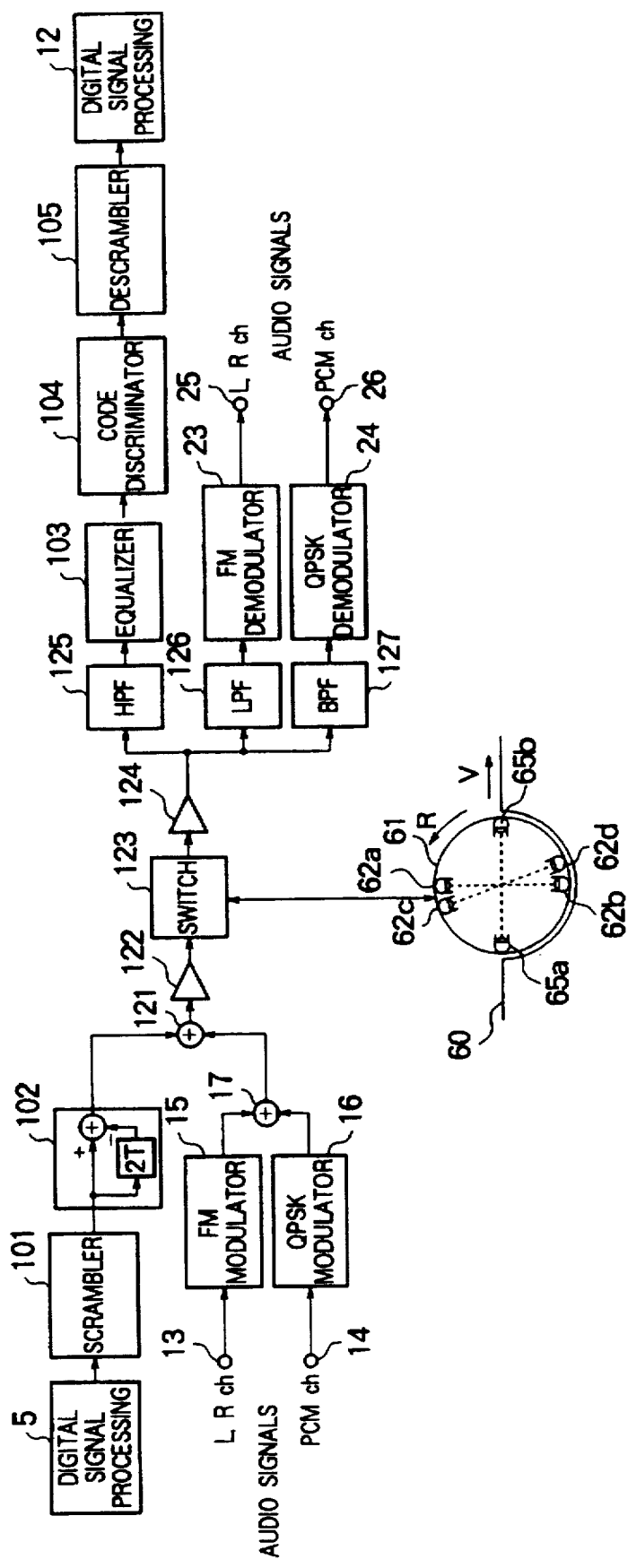
FIG. 12 is a block diagram showing a still further embodiment of the rotary head type magnetic recording and reproducing apparatus according to the present invention.

FIG. 12 is a block diagram showing the principal portion, that is, only the recording and reproducing system for the compressed digital signal and the audio signal in a still further embodiment of the rotary head type magnetic recording and reproducing apparatus according to the present invention. Those parts corresponding to those parts in FIGS. 1, 5 and 9 are designated by the same reference numerals and their descriptions are omitted.

Figure 13:
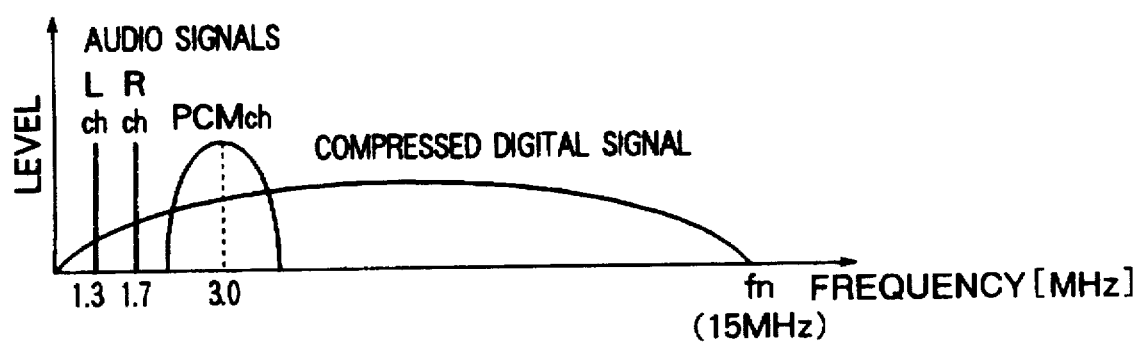
FIG. 13 is a diagram showing illustrative examples of the frequency spectrum of the audio signal and the compressed digital signal in the embodiment shown in FIG. 12.

In FIG. 12, the compressed digital signal formatted by the recording-system digital signal processing circuit 5 and having error correction codes and header information added thereto is randomized by the scrambler 101, and supplied to the (1-D) arithmetic circuit 102. The compressed digital signal is subjected to a partial response process in which the compressed digital signal delayed by two bit periods 2T is subtracted from the digital signal itself. Like in the embodiment shown in FIG. 9, the output signal from the (1-D) arithmetic circuit 102 is added with the composite signal from the adder 17, and is recorded on the tape 60. The frequency spectrum of the record signals supplied to the magnetic heads 65a, 65b in this case are shown in FIG. 13.

Needless to say, in reproduction, as in the embodiment shown in FIG. 5, the compressed digital signal is processed by the code discriminator 114, the 8-10 demodulator 115, and the reproducing-system digital signal processing circuit 12.

In this embodiment, the present invention is applied not to recording by carrier modulation but to recording of a baseband signal. As shown in FIG. 13, the compressed digital signal is converted into a signal which has no DC components and the frequency domain corresponding to the frequency band of the frequency modulated audio signal suppressed by the scrambler 101 and the (1-D) arithmetic circuit 102. Thus, as in the embodiment shown in FIG. 9, crosstalk between the audio signals and the compressed digital signal can be avoided.

Figure 14:
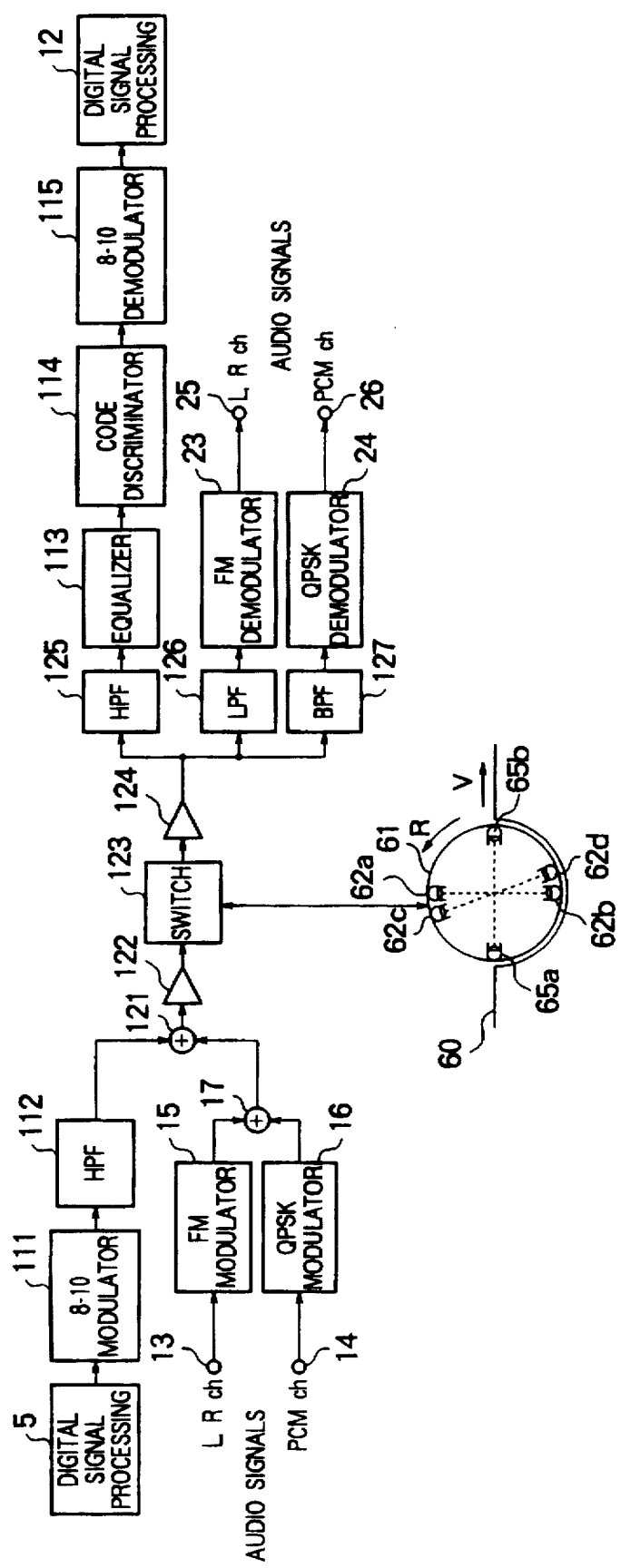
FIG. 14 is a block diagram showing an additional embodiment of the rotary head type magnetic recording and reproducing apparatus according to the present invention.

FIG. 14 is a block diagram showing the principal portion, that is, the recording and reproducing system for the compressed digital signal and the audio signal in an additional embodiment of the rotary head type magnetic recording and reproducing apparatus according to the present invention, and those parts corresponding to those parts in FIGS. 1, 7 and 9 are designated by the same reference numerals and their descriptions are omitted.

In FIG. 14, the compressed digital signal formatted by the recording-system signal processing circuit 5 and having error correction codes and header information added thereto is converted from every 8 bits into 10-bit codes by the 8-10 modulator 111 as in the embodiment shown in FIG. 7 and, thus, the the compressed digital signal has its frequency band corresponding to the low frequency band of the modulated audio signal further suppressed by the HPF 112 and comes to have a frequency spectrum shown in FIG. 8. The compressed digital signal from the HPF 112 is supplied to the adder 121 and added with the composite signal from the adder 17, and recorded on the magnetic tape 60. The frequency spectrum of the record signals supplied to the magnetic heads 65a, 65b in this case are shown in FIG. 15.

Figure 15:
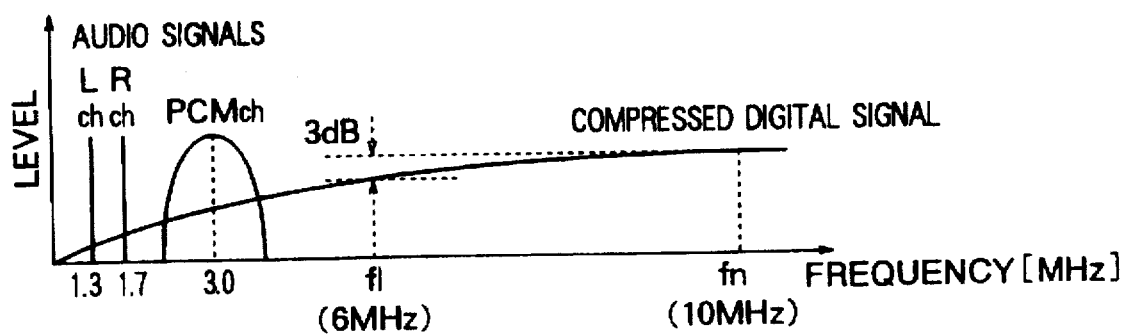
FIG. 15 is a diagram showing illustrative examples of the frequency spectrum of the audio signal and the compressed digital signal in the embodiment shown in FIG. 14.

As has been described, in this embodiment, like in the embodiment shown in FIG. 12, the present invention is applied to baseband recording, and the compressed digital signal is converted, as shown in FIG. 15, into a signal which has no DC components and the frequency domain corresponding to the low frequency band of the modulated audio signal suppressed by the 8-10 modulator 111 and the HPF 112, and even when the compressed digital signal is recorded together with the composite signal of the audio signals, like in the embodiment shown in FIG. 9, crosstalk between the audio signals and the compressed digital signal can be avoided.

By receiving the compressed digital signal from digital broadcasting and the luminance signal and the color difference signals obtained by expanding the compressed digital signal by the digital expander 4 (FIG. 1) from the input terminals 27, 28 (FIG. 1), the compressed digital signal and the video signal restored by being expanded can be recorded simultaneously on the magnetic tape 60.

Figure 16:
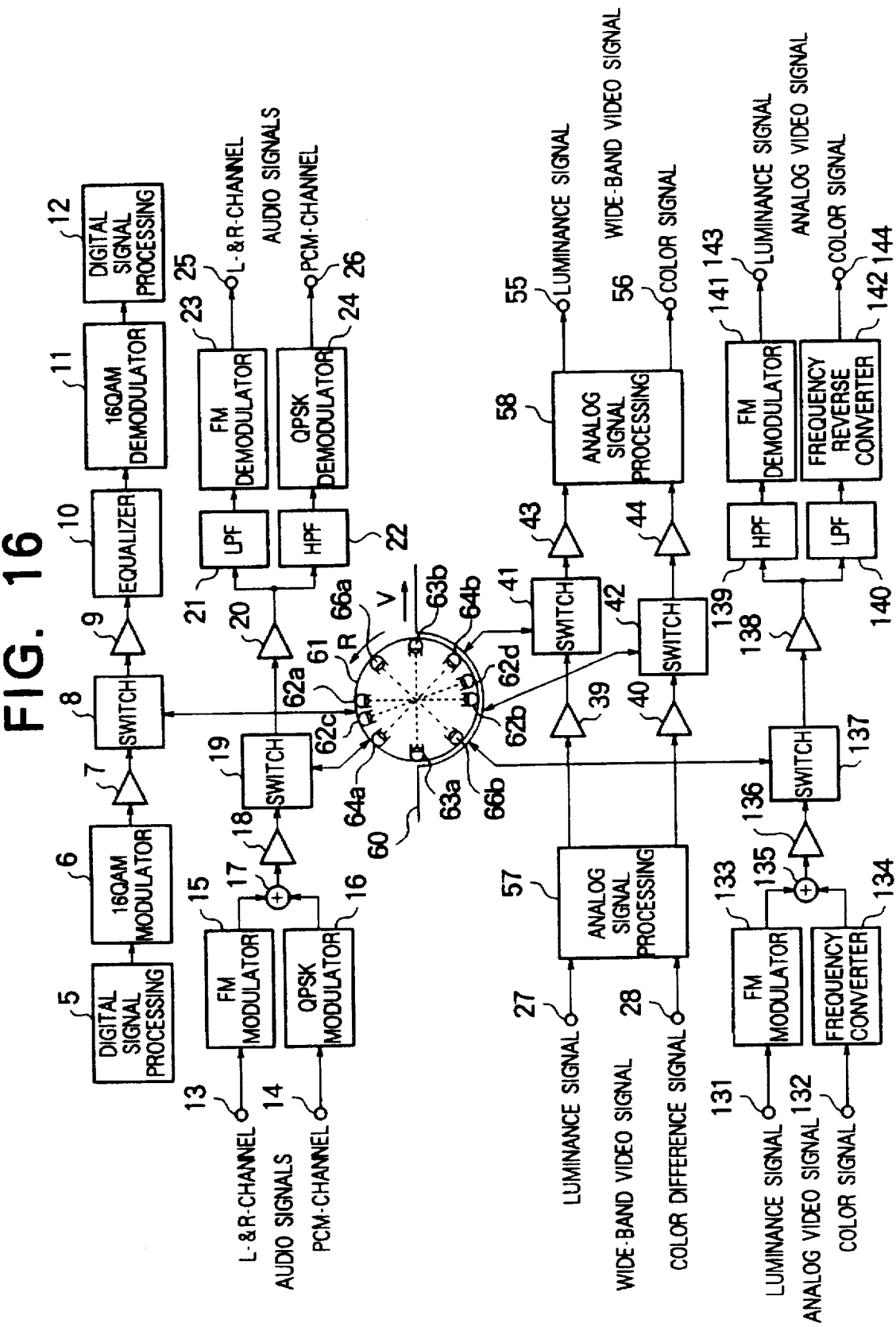
FIG. 16 is a block diagram showing yet another embodiment of the rotary head type magnetic recording and reproducing apparatus according to the present invention.

FIG. 16 is a block diagram showing yet another embodiment of the rotary head type magnetic recording and reproducing apparatus according to the present invention. Reference numerals 131, 132 denote input terminals, 133 denotes an FM modulator, 134 denotes a frequency converter, 135 denotes an adder, 136 denotes a recording amplifier, 137 denotes a recording/reproduction change-over switch, 138 denotes a reproduction amplifier, 139 denotes an HPF, 140 denotes an LPF, 141 denotes an FM modulator, 142 denotes a frequency reverse converter, 143 and 144 denotes output terminals, and those parts constitute the recording and reproducing system for the current analog video signal. The parts corresponding to the parts in FIG. 1 are designated by the same reference numerals and their descriptions are omitted.

In FIG. 16, the input terminals 131, 132, the FM modulator 133, the frequency converter 134, the adder 10 135, the recording amplifier 136, the recording/reproduction change-over switch 137, the reproduction amplifier 138, the HPF 139, the LPF 140, the FM demodulator 141, the frequency reverse converter 142 and the output terminals 143, 144 constitute a recording and reproducing system for the current analog video signal.

The luminance signal of the current system analog video signal is input from the input terminal 131, while the carrier chrominance signal of this analog video signal is input from the input terminal 132. The chrominance signal is frequency-modulated by the FM modulator 133 and the carrier chrominance signal is frequency-modulated by the FM modulator 133, while the carrier chrominance signal is converted to a low frequency by the frequency converter 134, and those two signals are added together by the adder 135. In this case, like in the prior art, the two signals are added together such that the FM-modulated luminance signal is arranged on the high frequency side, and the low-frequency-carrier chrominance signal is arranged on the low frequency side. The composite signal from the adder 135 is amplified by the recording amplifier 136, then supplied through the recording/reproduction change-over switch 137 to the magnetic heads 66a, 66b, recorded on the magnetic tape 60.

When the above-mentioned current system analog video signal is recorded, the analog wide-band video signal and the compressed digital signal are not recorded. To be more specific, either the recording mode for the current system analog video signal or the recording mode for the analog wide-band video signal and the compressed digital signal is selected. However, in either of these record modes, it is possible to record the audio signals of the L-, R channels and the audio signal of the PCM channel.

The above-mentioned composite signal reproduced from the magnetic tape 60 by the magnetic heads 66a, 66b passes through the recording/reproduction change-over switch 137, and is amplified by the reproduction amplifier 138, and separated by the HPF 139 and the LPF 140 into the frequency-modulated luminance signal and the low-frequency carrier chrominance signal. The frequency-modulated luminance signal is demodulated by the FM demodulator 141 into a baseband luminance signal, and the low-frequency carrier chrominance signal is reverse-converted by the frequency reverse converter 142 into a carrier chrominance signal of the original color sub-carrier frequency, and those signals are output respectively from the output terminals 143, 144.

In the above operation, either the reproduction mode for the current-system analog video signal or the reproduction mode for the analog wide-band video signal and the compressed digital signal is selected. This selection can be done automatically by detecting the presence or absence of the synchronizing signal of the reproduced signal.

The parts other than those which have been described are corresponding to the parts in the embodiment shown in FIG. 1.

Figure 17:
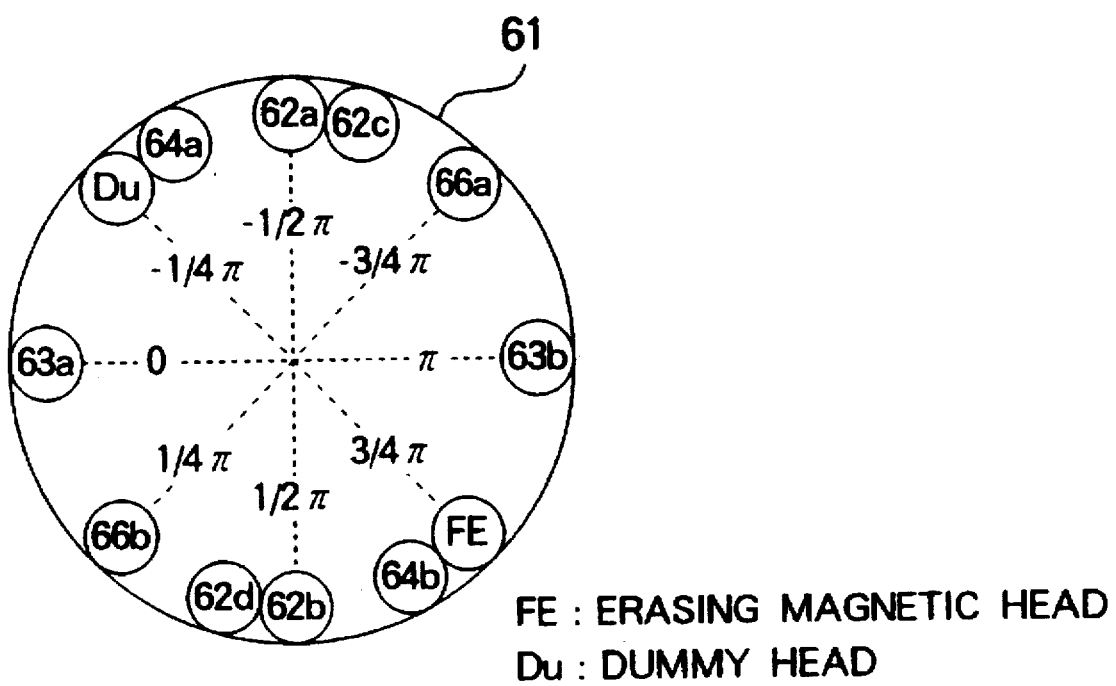
FIG. 17 is a diagram showing the arrangement of the magnetic heads on the rotary drum in the embodiment shown in FIG. 16 for recording and reproducing the current type of analog video signal.

FIG. 17 is a diagram showing an example of arrangement of the magnetic heads on the rotary drum 61.

In FIG. 17, it it is assumed that one of the magnetic heads for recording and reproducing the audio signal, for example, 63a, is set at the reference position of 0 radian, the other magnetic head 63b for recording and reproducing the audio signal, the magnetic heads 64a and 64b for recording and reproducing the compressed digital data, and the magnetic heads 62a–62d for recording and reproducing the analog wide-band video signal are arranged at the same positions as shown in FIG. 4. One magnetic head 66a for recording and reproducing the current analog video signal is placed at a position shifted $-\frac{3}{4}\pi$ radians from the reference position, while the other magnetic head 66b for recording and reproducing the current analog video signal is placed at a position shifted $\frac{1}{4}\pi$ radian from the reference position. Therefore, the magnetic heads 66a and 66b for recording and reproducing the current analog video signal are placed 180° opposite to each other. Accordingly, the track patterns similar to those formed with the conventional VTR can be formed on the magnetic tape 60.

As described above, in addition to having the function of recording and reproducing the analog wide-band video signal and the compressed digital signal, the magnetic recording and reproducing apparatus according to this embodiment is provided with compatibility with conventional VTRs, so that this novel apparatus can also record and reproduce the current analog video signal from the magnetic tape recorded by the conventional VTRs.

Figure 18:
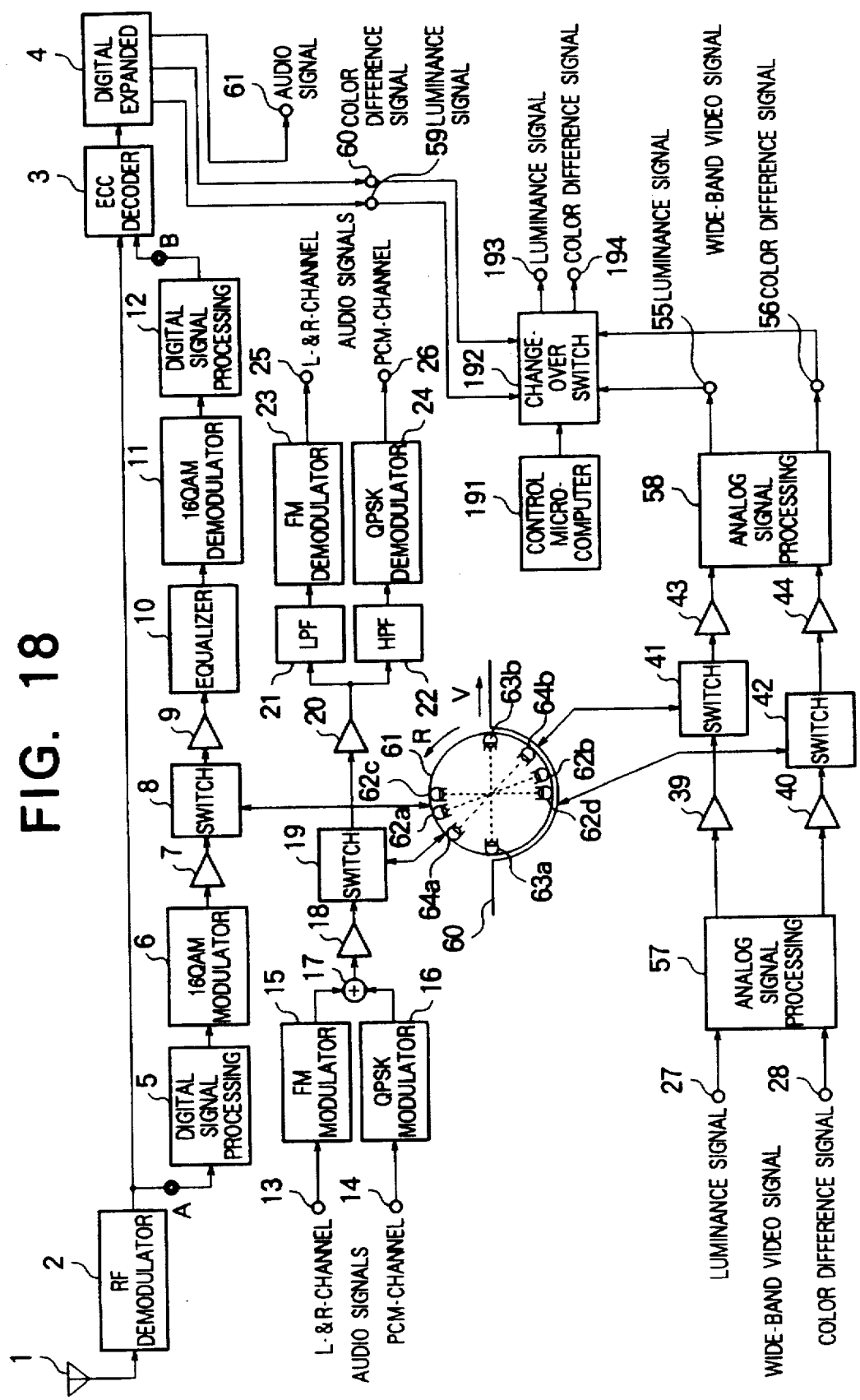
FIG. 18 is a block diagram showing a further embodiment of the rotary head type magnetic recording and reproducing apparatus according to the present invention.

FIG. 18 is a block diagram showing a further embodiment of the rotary head type magnetic recording and reproducing apparatus according to the present invention. Reference numeral 191 denotes a control microcomputer, 192 denotes a digital/analog change-over switch, and 193 and 194 denote output terminals, and the parts corresponding to the parts shown in FIG. 1 are designated by the same reference numerals and their descriptions are omitted.

In FIG. 18, the control microcomputer 191 controls the processing blocks, and is particularly in charge of control of the servo system. For trick plays such as variable speed reproduction, the control microcomputer 191 supplies the digital/analog change-over switch 192 with a control signal for performing variable speed reproduction. In this case, the digital/analog change-over switch 192, which normally selects the expanded luminance signal and color difference signals of the compressed digital signal from the digital expander 4, on receiving the control signal from the control microcomputer 191 in a trick play, selects the luminance signal and color difference signals of the analog wide-band video signal reproduced in variable speed reproduction and supplied from the reproducing-system analog signal processing circuit 58 to output those signals from the output terminals 193, 194.

For a digital broadcast television set having output switchable means, such as the digital/analog change-over switch 192, if the luminance signal and the color difference signals from the digital expander 4 and the luminance signal and the color difference signals from the analog signal processing circuit 58 are supplied to such means and the above-mentioned control signal from the control microcomputer 191 is supplied to such means, the operation mentioned above can be performed.

As has been described, in this embodiment, by reproducing the analog wide-band video signal from the magnetic tape in variable speed reproduction, reproduced images can be obtained.

In the embodiments which have been described, the L- and R-channel audio signals and the PCM-channel audio signal are multiplexed as a composite signal and recorded, but the present invention is not limited to such. For example, only the L- and R-channel audio signals or only the PCM-channel audio signal may be recorded.

As described, according to the above-described embodiment, the analog wide-band video signal, the audio signals and the compressed digital signal can be recorded on the same recording medium. This provides compatibility which will be described in the following.

Even by economical magnetic recording and reproducing apparatuses which have only the function of recording and reproducing the analog wide-band video signal without having the function of digital recording and reproduction, the magnetic tape having signals recorded according to the present invention can be reproduced.

Furthermore, high quality digital images can be reproduced.

Also, the magnetic tape recorded by the current analog VTR can be reproduced.

Thus, this invention makes it possible for the same magnetic tape to be reproduced by magnetic recording and reproducing apparatuses manufactured to different specifications.

Further, in variable speed reproduction, it has been previously difficult to reproduce proper images from compressed digital signals but in the variable speed reproduction according to the present invention, such has become possible by switching to reproduction of the analog wide-band video signal.

FIG. 19 is a block diagram showing yet another embodiment of the rotary head type magnetic recording and reproducing apparatus according to the present invention. In FIG. 19, reference numerals 201 and 202 denote input terminals, 203 denotes a recording-system analog signal processing circuit, 204 and 205 denote FM modulators, 206 and 207 denote recording amplifiers, 208 and 209 denote analog/digital change-over switches, 210 and 211 denote recording/reproduction change-over switches, 212 and 213 denote analog/digital change-over switches, 214 and 215 denote reproduction amplifiers, 216 and 217 denote FM demodulators, 218 denotes a reproduction-system analog signal processing circuit, and 219 and 220 denote output terminals, and those parts constitute the recording and reproducing system for the analog wide-band video signal. Reference numerals 221 to 223 denote input terminals, 224 and 225 denote FM modulators, 226 denotes a PCM recording-system digital signal processing circuit, 227 denotes a QPSK modulator, 228 denotes an adder, 229 denotes a recording amplifier, 230 denotes a switch, 231 denotes a recording/reproduction change-over switch, 232 denotes a reproduction amplifier, 233, 234 and 235 denote band pass filters (hereafter referred to as BPF's), 236 and 237 denotes FM demodulators, 238 denotes a QPSK demodulator, 239 denotes a PCM reproducing-system digital signal processing circuit, 240 to 242 denote output terminals, and those parts constitute the recording and reproducing system for the audio signals. In addition, 243 denotes an input terminal, 244 denotes a recording-system digital signal processing circuit, 245 and 246 denote QPSK modulators, 247 and 248 denote recording amplifiers, 249 and 250 denote reproduction amplifiers, 251 and 252 denote equalizers, 253 and 254 denote QPSK demodulators, 255 denotes a reproducing-system digital signal processing circuit, 256 denotes an output terminal, and those parts and the recording/reproduction change-over switches 210, 211 constitute the recording and reproducing system for the compressed digital signal. Reference numeral 257 denotes an antenna, 258 denotes an RF demodulator, 259 denotes a correction decoder, 260 denotes a digital expander, 261 and 262 denote output terminals, 263 denotes an external switch, 264 denotes an analog/digital decision circuit, 300 denotes a rotary drum, 301a, 301b, 302a, 302b, 303a and 303b denote magnetic heads, and 310 denotes a magnetic tape.

Referring to FIG. 19, the operation of the recording system will first be described.

The external switch 263 changes over the record signals supplied to the magnetic heads 301a, 301b and 302a, 302b depending on the type of signal, analog or digital. Further, the external witch 263 is used to change the recording condition of the audio signals for discriminating between an analog signal and a digital signal in reproduction, and more specifically, it switches over the analog/digital change-over switches 208, 209 and the switch 230. When an analog signal is recorded, the analog/digital change-over switches 208, 209 are set to the analog (A) side, and the switch 230 is turned on. When a digital signal is recorded, the analog/digital change-over switches 208, 209 are set to the digital (D) side, and the switch 230 is turned off.

When the external 263 switch selects an analog signal, that is, when the analog/digital change-over switches 208, 209 are set to the A side, in the case of the analog wide-band video signal specified for 1125 scanning lines, a 16 to 9 aspect ratio and a luminance signal frequency band of 20 MHz, the luminance signal is input from the input terminal 201, and the carrier chrominance signal is input from the input terminal 202. These signals are expanded in terms of time base, for example, and divided into signals for two channels by the recording-system analog signal processing circuits 203, then undergo the time-domain multiplexing (TCI) process, thereby being converted into two signals for two separate paths. The two signals are respectively frequency-modulated by the FM modulators 204, 205 to be signals of the frequency band as shown in FIG. 2A, then amplified by the recording amplifiers 206, 207. The signal which passes through the recording/reproduction change-over switch 210 is supplied to the magnetic heads 301a, 301b, while the signal which passes through the recording/reproduction change-over switch 211 is supplied to the magnetic heads 302a, 302b, and those signals are recorded in parallel on two video tracks adjacent to each other. The R indicates the rotating direction of the rotary drum 300, and the V indicates the running direction of the magnetic tape 310.

In this case, the switch 230 is in the ON state, so that the audio signals are recorded on the audio tracks. The L-channel audio signal is input from the input terminal 221, the R-channel audio signal is input from the input terminal 222, and the PCM-channel audio signal is input from the input terminal 223. The L- and R-channel audio signals are frequency-modulated by the FM modulators 224, 225. The PCM-channel audio signal is added with an ID word (identification code) or the like by the PCM recording-system digital signal processing circuit 226, then modulated using the quadrature four phase modulation (QPSK) method by the QPSK modulator 227. Those audio signals are added together by the adder 228, so that a composite signal frequency-modulated as shown in FIG. 2B is obtained. This composite signal is amplified by the recording amplifier 229, and when the switch 230 is in the ON state, is supplied through the recording/reproduction change-over switch 231 to the magnetic heads 303a, 303b and recorded on audio tracks each adjacent to two video tracks on the magnetic tape 310.

Suppose now that when the external switch 263 selects a digital signal, that is, when the analog/digital change-over switches 208, 209 are set to the D side, a compressed digital signal containing a wide-band video signal having the main parameters similar to those of the analog wide-band video signal, and an audio signal which have been reduced in data amount by efficient coding and broadcasted in digital form, is received by the antenna 257 and is RF-demodulated by the RF demodulator 258, so that the compressed digital signal of a bit rate of 24 Mbps is input from the input terminal 243. This digital signal is added with correction codes by the recording-system digital signal processing circuit 244, and by being divided to blocks, are made into a signal of a bit rate of 30 Mbps, and is divided into signals for two paths, that is, signals of 15 Mbps each, for example. The respective signals are QPSK-modulated by the QPSK modulators 245, 246, come to have a frequency band as shown in FIG. 2C, and are amplified by the recording amplifiers 247, 248. The signal which travels through the recording/reproduction change-over switch 210 is supplied to the magnetic heads 301a, 301b, while the signal which travels through the recording/reproduction change-over switch 211 is supplied to the 302a, 302b. As in the case of the analog signal, the digital signals are recorded in parallel on two video tracks adjacent to each other on the magnetic tape 310.

Since the switch 230 is in the OFF state in this case, the audio signals are not recorded on the audio tracks.

Description will now be made of the operation of the reproducing system.

The analog/digital decision circuit 264 is responsive to the output signal from the reproduction amplifier 232 so as to change over the processing paths for the signals reproduced by the magnetic heads 301a, 301b and 302a, 302b. More specifically, the analog/digital decision circuit 264 is used to change over the analog/digital change-over switches 212, 213. The decision-making operation in this case is as follows. If any output signal is given by the reproduction amplifier 232, in other words, if the audio signal has been recorded on the audio tracks on the magnetic tape 310, the analog/digital change-over switches 212, 213 are set to the A side. If no audio signal has been recorded, the analog/digital change-over switches 212, 213 are set to the D side.

Reproduction of the audio signals will first be described. The audio signals reproduced from each audio track adjacent to two video tracks of the magnetic tape 310 by the magnetic heads 303a, 303b pass through the recording/reproduction change-over switch 231 and are amplified by the reproduction amplifier 232. The FM L-channel audio signal is separated out by the BPF 233, the FM R-channel audio signal is separated out by the BPF 234, and the QPSK PCM-channel audio signal is separated by the BPF 235. The FM L-channel audio signal is frequency-demodulated by the FM demodulator 236 to reproduce the L-channel audio signal, the FM R-channel audio signal is frequency-demodulated by the FM demodulator 237 to reproduce the R-channel audio signal, and the QPSK PCM-channel audio signal is QPSK-demodulated by the QPSK demodulator 238, and processed by the reproducing-system PCM digital signal processing circuit 239 to reproduce the PCM-channel audio signal. Those audio signals are output from the output terminals 240, 241 and 242.

If the analog/digital decision circuit 264 decides that the signal amplified by the reproduction amplifier 232 is analog, that is, when the analog/digital change-over switches 212, 213 are set to the A side, the signals reproduced from two video tracks adjacent to each other on the magnetic tape 310 by the magnetic heads 301a, 301b and 302a, 302b pass through the recording/reproduction change-over switches 210, 211, and are amplified by the reproduction amplifiers 214, 215. Those signals are frequency-demodulated by the FM demodulators 216, 217, undergo a process by the reproducing-system analog signal processing circuit 218, which is the reverse of the process by the recording-system analog signal processing circuit 203, and as a result, the baseband luminance signal is output from the output terminal 219, and the original carrier chrominance signal is output from the output terminal 220.

Meanwhile, if no recorded audio signal is found on the audio tracks on the magnetic tape 310 and the analog/digital decision circuit 264 decides that the signal to be reproduced is digital, that is, when the analog/digital change-over switches 212, 213 are set to the D side, the signals reproduced from two mutually adjacent video tracks on the magnetic tape 310 by the magnetic heads 301a, 301b and 302a, 302b pass through the recording/reproduction change-over switches 210, 211, are amplified by the reproduction amplifiers 249, 250, and equalized in waveform by the equalizers 251, 252. Those waveform-equalized signals are QPSK-demodulated by the QPSK demodulators 253, 254, receive a process by the reproducing-system digital signal processing circuit 255, which is the reverse of the process by the recording-system digital signal processing circuit 244, and as a result, the original compressed digital signal is output from the output terminal 256. This compressed digital signal is subjected to an error correction decoding process by the error correction decoding circuit 259, for example, then converted in reverse by the digital expander 260 into the original video signal and audio signal, and output from the output terminals 261, 262.

FIG. 3 is a diagram showing the track patterns on the magnetic tape 310 in this embodiment. With reference to the reference numerals in the parentheses, the track patterns will be described. Reference numerals 311a and 311b respectively denote the tracks formed by the magnetic heads 301a, 301b; 312a and 312b denote the tracks formed by the magnetic heads 302a, 302b; 313a and 313b denote the tracks formed by the magnetic heads 303a, 303b. In this embodiment, when a digital signal is recorded, nothing is recorded on the tracks 313a, 313b.

In short, in this embodiment, the analog wide-band video signal and the compressed digital signal can be recorded and reproduced on the same recording medium by modulating them to narrow frequency bands. By utilizing the audio tracks, the analog/digital change-over switches can be set, and the analog and digital signals can be recorded or reproduced easily In this embodiment, the QPSK modulation method is used for modulating the compressed digital signal, but the modulation method is not limited to this and any modulation method can be used so long as the method can modulate the compressed digital signal to produce a record signal of a frequency allocation equivalent to that for the analog wide-band video signal. For example, if a modulation method capable of narrowing down the frequency band, such as the 16-value quadrature amplitude modulation (16 QAM) method, the amount of information to record can be further increased.

In this embodiment, with regard to recording the audio signal, description has been made of a case where an audio signal of PCM channel is added to the other audio signals, but this is not the only possible method, in other words, there is no problem if only the audio signals of the L- and R-channels are recorded.

FIG. 20 is a block diagram showing the principal portion, which includes the portion corresponding to the recording and reproducing system for the compressed digital signal in the embodiment in FIG. 19, in yet another embodiment of the rotary head type magnetic recording and reproducing apparatus according to the present invention. Reference numeral 285 denotes a scrambler, 286 denotes a (1-D) arithmetic circuit, 287 denotes an equalizer, 288 denotes a code discriminator, and 189 denotes a descrambler, and the parts corresponding to the parts in FIG. 19 are designated by the same reference numerals and their descriptions are omitted. The blocks 244, 285, 286, 247 (248), 210(211), 249 (250), 287, 288, 289, and 255 correspond to the blocks 5, 101, 102, 7, 8, 9, 103, 105, and 12 in FIG. 5. The operation of the construction in FIG. 20 is basically the same as that of the construction in FIG. 5, so only the different portions will be described.

In FIG. 20, the digital signal, added with correction codes by the recording-system digital signal processing circuit 244 and divided into blocks, is randomized by the scrambler 285, and has the digital signal delayed by a one-bit period T subtracted from itself. As a result, the digital signal output from the (1-D) arithmetic circuit 286 has become a record signal which has no DC components and has the low frequency spectral components suppressed. The Fn (=½T) in FIG. 21 is a so-called Nyquist frequency and corresponds to ½ of the bit rate frequency. Like in the embodiment shown in FIG. 19, this record signal is recorded on the magnetic tape 310.

In reproduction, the original compressed digital signal can be obtained as in the embodiment in FIG. 19.

As is clear from the above description, in this embodiment, not by recording through carrier modulation but by baseband recording, the compressed digital signal can be recorded and reproduced.

In this embodiment, description has been made of a case where the record signal delayed by one bit period T is subtracted from the record signal itself by the (1-D) arithmetic circuit 286, but by arranging for the record signal delayed by two bit periods 2T to be subtracted from the record signal itself, the amount of information to record can be further increased.

Figure 22:
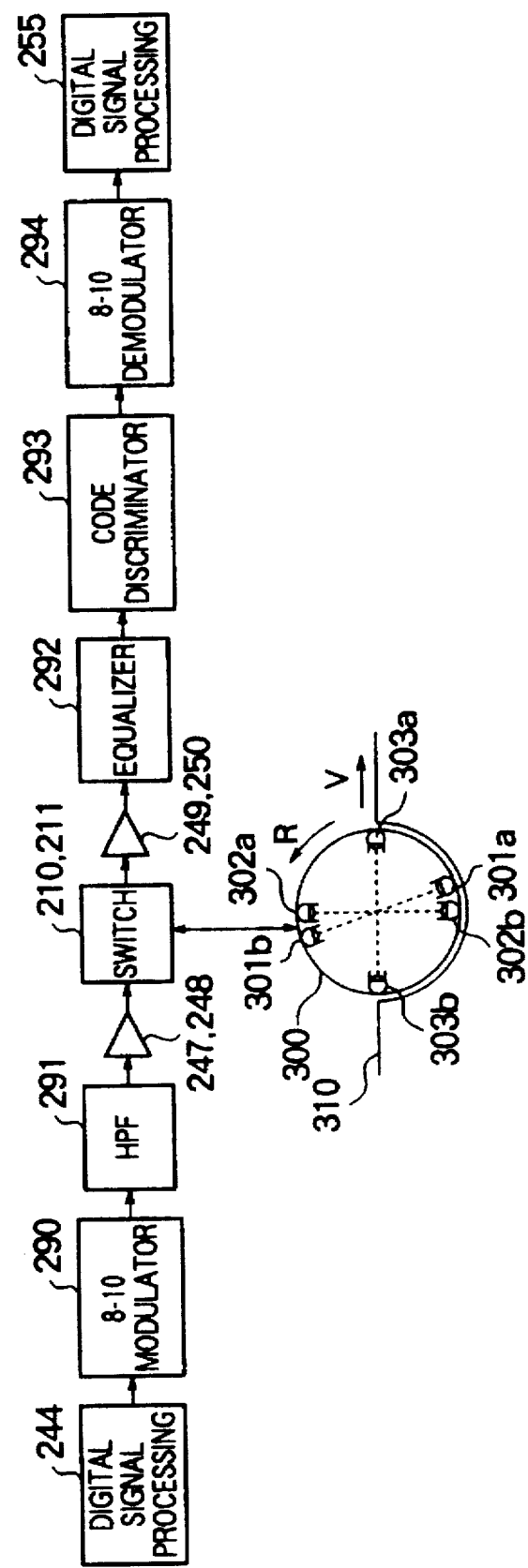
FIG. 22 is a block diagram showing another embodiment of the principal parts of the rotary head type magnetic recording and reproducing apparatus according to the present invention.

FIG. 22 is a block diagram showing the principal portion, which includes the portion corresponding to the recording and reproducing system for the compressed digital signal in the embodiment in FIG. 19, in another embodiment of the rotary head type recording and reproducing apparatus according to the present invention. Reference numeral 290 denotes an 8-10 modulator, 291 denotes a high pass filter (hereafter referred to as HPF), 292 denotes an equalizer, 293 denotes a code discriminator, and 294 denotes an 8-10 demodulator. The parts corresponding to the parts in FIG. 19 are designated by the same reference numerals. The construction and the operation of this embodiment are the same as those in FIG. 7, and their descriptions are omitted. In this embodiment, a record signal which has low-frequency spectral components sufficiently suppressed can be obtained.

As has been explained, like in the embodiment shown in FIG. 20, the compressed digital signal can be recorded and reproduced based on baseband recording.

In this embodiment, as an example of DC-free coding of digital data, the 8-10 modulation is used, but this is not the only possible method, for example, the mirror square coding or the 8-14 modulation may be used as in the embodiment shown in FIG. 7.

Figure 23:
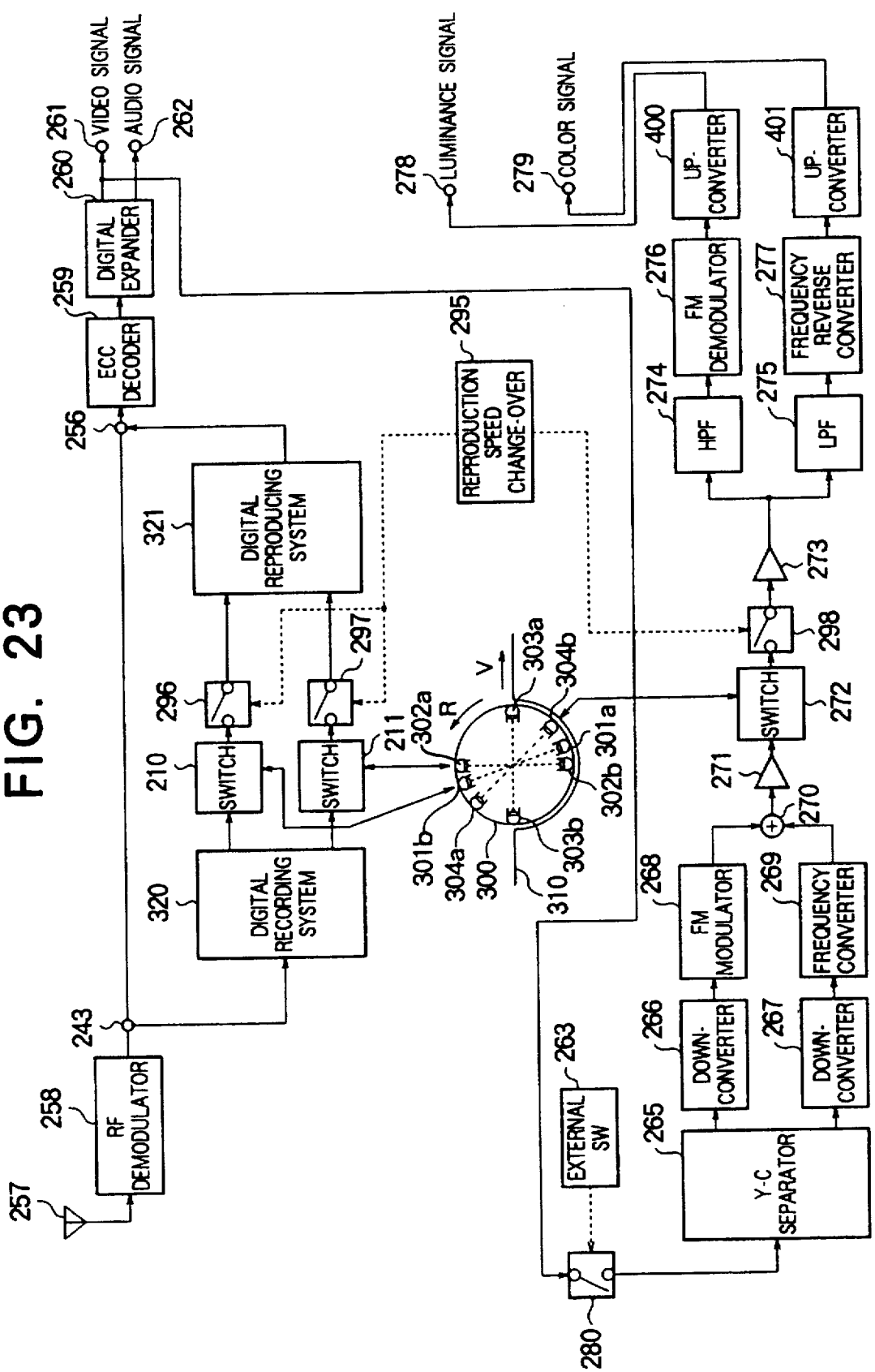
FIG. 23 is a block diagram showing the principal portion of yet another embodiment of the rotary head type magnetic recording and reproducing apparatus according to the present invention.

FIG. 23 is a block diagram showing the principal portion, that is, a portion added to the block diagram in FIG. 19 in yet another example of the rotary head type magnetic recording and reproducing apparatus according to the present invention. Reference numeral 265 denotes a luminance/color signal separator, 266 and 276 denote down converters, 268 denotes an FM modulator, 269 denotes a frequency converter, 270 denotes an adder, 270 denotes a recording amplifier, 272 denotes a recording/reproduction change-over switch, 273 denotes a reproduction amplifier, 274 denotes an HPF, 275 denotes a low pass filter (hereafter referred to as LPF), 275 denotes a low pass filter (hereafter referred to as LPF), 276 denotes an FM demodulator, 277 denotes a frequency reverse converter, 400 and 401 denote up converters, 278 and 279 denote output terminals, 280, 296, 297 and 298 denote switches, 295 denotes a reproduction speed change-over switch, 304a and 304b denote magnetic heads, 320 denotes a digital recording system including the digital signal processing circuit 244 to the recording amplifier 248 in FIG. 19, 321 denotes a digital reproducing system including the reproduction amplifier 249 to the reproducing-system digital signal processing circuit 255, and the parts corresponding to the parts in FIG. 19 are designated by the same reference numerals and their descriptions are omitted.

Figure 24A:
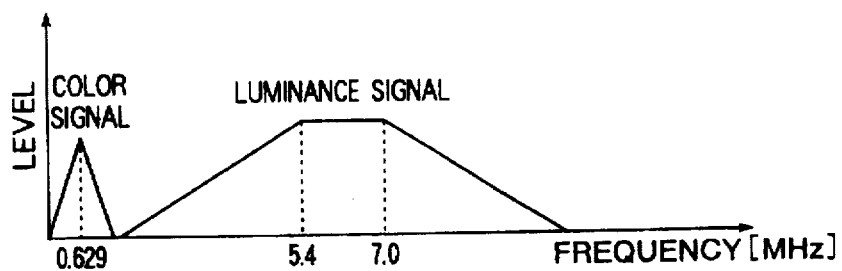
FIGS. 24A and 24B are diagrams showing illustrative examples of the frequency spectra of the down-converted wide-band video signal and the audio signal in the embodiment shown in FIG. 23.

In FIG. 23, when a digital signal is recorded on two tracks on the magnetic tape 310, the external switch 263 turns the switch 280 ON. The wide-band video signal output from the digital expander 260 is separated by the luminance/color signal separator 265 into the luminance signal and the color signal, which signals are down-converted by the down converters 266, 267 as they are thinned out a few lines, for example, and and their frequencies are reduced to levels of a video signal of the current NTSC system. The thus down-converted luminance signal is frequency-demodulated by the FM modulator 268, while the down-converted color signal is converted by the frequency converter 269 to a low frequency band, and those signals are added together by the adder 270 and becomes a composite signal frequency-modulated to a frequency band as shown in FIG. 24A. The composite signal is amplified by the recording amplifier 271, then supplied through the recording/reproduction change-over switch 272 to the magnetic heads 304a, 304b, and recorded superposed over the audio signal at the audio track on the magnetic tape 310.

Figure 24B:

Note that the magnetic heads 304a, 304b have an azimuth angle different from that of the magnetic heads 303a, 303b, and the frequency band of the audio signals is in a spectrum as shown in FIG. 24B. Therefore, for example, the audio signals can be recorded superposed in the deep-layer portion of the tape below the down-converted wide-band video signal recorded on the same track.

The reproduction speed change-over switch 295 changes over normal speed reproduction and high speed reproduction in reproduction. More specifically, in normal speed reproduction, the change-over switch 295 turns the switches 296, 297 ON, the switch 298 OFF, and the compressed digital signal is reproduced. Conversely, in high speed reproduction, the switches 296, 297 are set in the OFF state and the switch 298 is set in the ON state, and the signal reproduced by the magnetic heads 304a, 304b is displayed.

The case in high speed reproduction will be described.

The signal reproduced from the audio track on the magnetic tape 310 by the magnetic heads 304a, 304b passes through the recording/reproduction switch 272, is amplified by the reproduction amplifier 273, and the FM luminance signal is separated out by the HPF 274, while the low-frequency color signal is separated out by the LPF 275. The FM luminance signal is frequency-demodulated by the FM demodulator 276 and becomes a down-converted luminance signal, while the low-frequency color signal is reverse-converted by the frequency reverse converter 277 into a down-converted color signal. The respective signals are up-converted by line interpolation, for example, by the up converters 400, 401, returned to the size of the original wide-band video signal, and output from the output terminals 278, 279.

Those output signals, having once been down-converted, deteriorate in resolution, for example, compared with the original wide-band video signal. However, this deterioration can be held within a permissible range by limiting the occasion for those signals to be output to variable speed reproduction, including high speed reproduction. With the compressed digital signal, the amount of data is ordinarily not constant but varies for each unit of display, so that high speed reproduction or the like is difficult, but this embodiment makes it possible to perform variable speed reproduction with ease.

In this embodiment, description has been made of a case where the down-converted video signal is recorded superposed over the audio signal. However, when it is possible to do without recording the audio signal, only the down-converted video signal can be recorded on the audio track. Furthermore, in this embodiment, when the audio signal is recorded, description has been made of a case where the audio signal of the PCM channel is always recorded multiplexed with the other audio signals. However, this is not the only possible form of embodiment. For example, needless to say, it is possible to record only the audio signals of the L- and R-channels.

Figure 25:
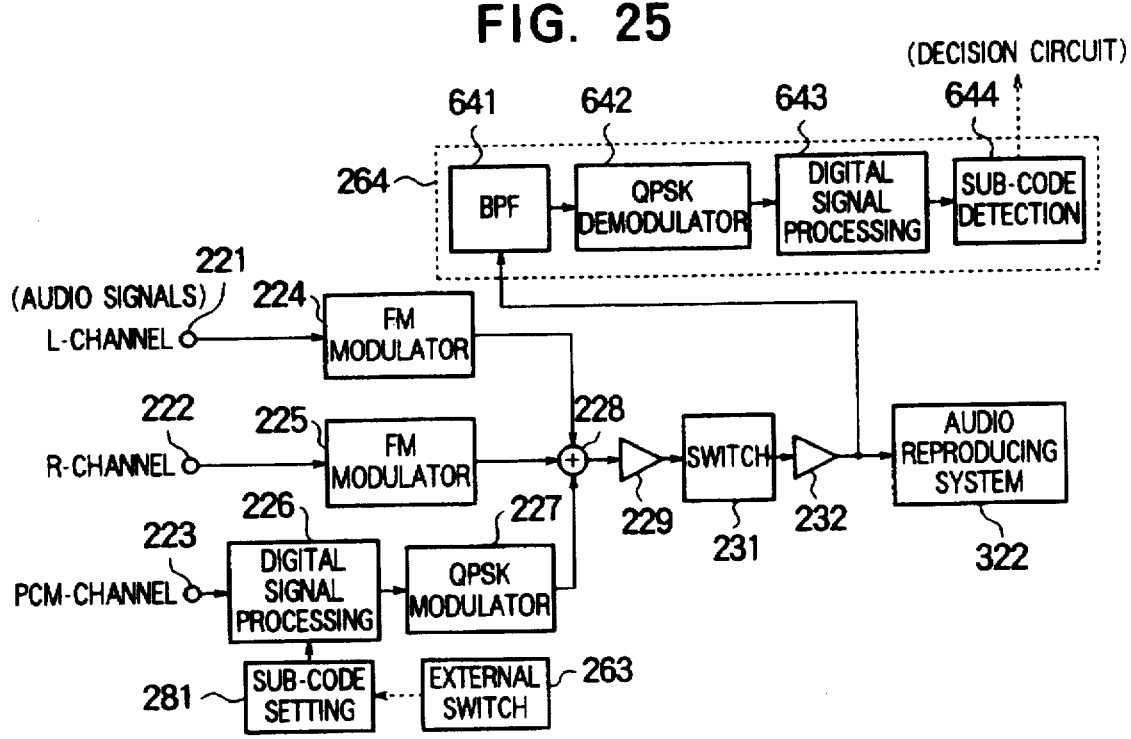
FIG. 25 is a block diagram showing the principal portion in a still further embodiment of the rotary head type magnetic recording and reproducing apparatus according to the present invention.

FIG. 25 is a block diagram showing a principal portion, which includes a part of the audio signal recording and reproducing system and the analog/digital decision circuit of the embodiment in FIG. 19, in a still further embodiment of the rotary head type magnetic recording and reproducing apparatus according to the present invention. Reference numeral 281 denotes a sub-code setting circuit, 641 denotes a BPF, 642 denotes a QPSK demodulator, 643 denotes a reproducing-system PCM digital signal processing circuit, 644 denotes a sub-code detector, 322 denotes audio signal reproducing system including the BPF 233 to the output terminal 242, and the parts corresponding to the parts in FIG. 19 are designated by the same reference numerals and their descriptions are omitted.

In FIG. 25, the sub-code setting circuit 281, when the analog/digital change-over switches are changed over to the analog side, for example, by the external switch 263, outputs a sub-code 0 and when the change-over switches are changed over to the digital side, outputs a sub-code 1. The recording-system PCM digital signal processing circuit 226 adds an unused ID (1 bit) code set to 1 or 0 according to the sub-code, to the PCM-channel audio signal. The PCM-channel audio signal is then modulated so as to be multiplex-recorded. In reproduction, the BPF 641, the QPSK demodulator 642 and the reproducing-system PCM digital signal processing circuit 643 respectively operate in exactly the same way as the BPF 235, the QPSK demodulator 238 and the reproducing-system digital signal processing circuit 239 in FIG. 19, and the sub-code detector 644 detects the sub-code according to the IF in the reproduced PCM-channel audio signal, and output an analog or digital decision signal.

As described above, in this embodiment, by using an unused ID code included in the PCM-channel audio signal, the analog/digital change-over switches can be switched over easily in reproduction.

Figure 26:
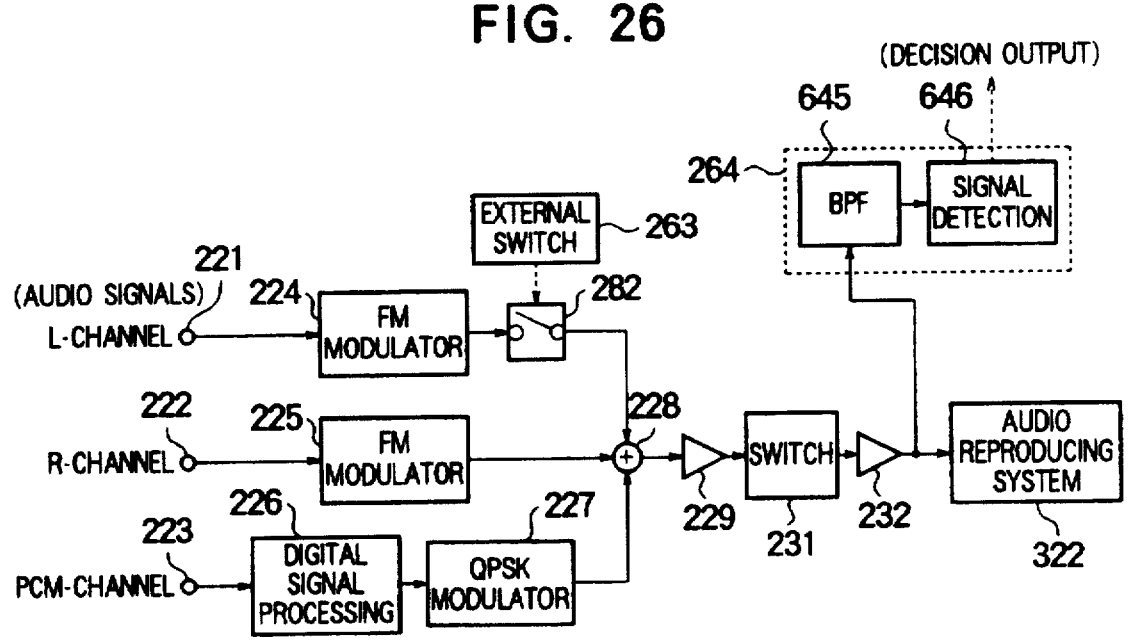
FIG. 26 is a block diagram showing the principal portion in a still additional embodiment of the rotary head type magnetic recording and reproducing apparatus according to the present invention.

FIG. 26 is a diagram showing the principal portion of a still further embodiment of the rotary head type magnetic recording and reproducing apparatus according to the present invention. The added parts different from those added in the embodiment shown in FIG. 25 are a switch 282, a BPF 645 and a signal detector 646.

In FIG. 26, when the input signal is analog, the switch 282 is set in the ON state by the external switch 263, the L-channel audio signal is recorded, and when the input signal is digital, the switch 282 is set in the OFF state so that the L-channel audio signal is not recorded. In reproduction, the BPF 645 performs the same operation as the BPF 233, and the signal detector 646 outputs an analog/digital decision signal according to a decision of whether or not there is included a frequency band carrier of the FM L-channel.

Therefore, in this embodiment, only by determining whether or not an FM L-channel audio signal is 10recorded, the analog/digital change-over switches can be switched out easily in reproduction.

Note that though the L-channel audio signal is used in this embodiment, no problem arises even if the R-channel audio signal is used instead, so that the position of the switch 282 may be changed and the BPF 645 may be changed to pass the R-channel audio signal.

Furthermore, in this embodiment, description has been made of a case where the PCM-channel audio signal is always multiplex-recorded, but this is not the only possible form of embodiment. For example, it is of course possible to record only the L- and R-channel audio signals.

Figure 27:
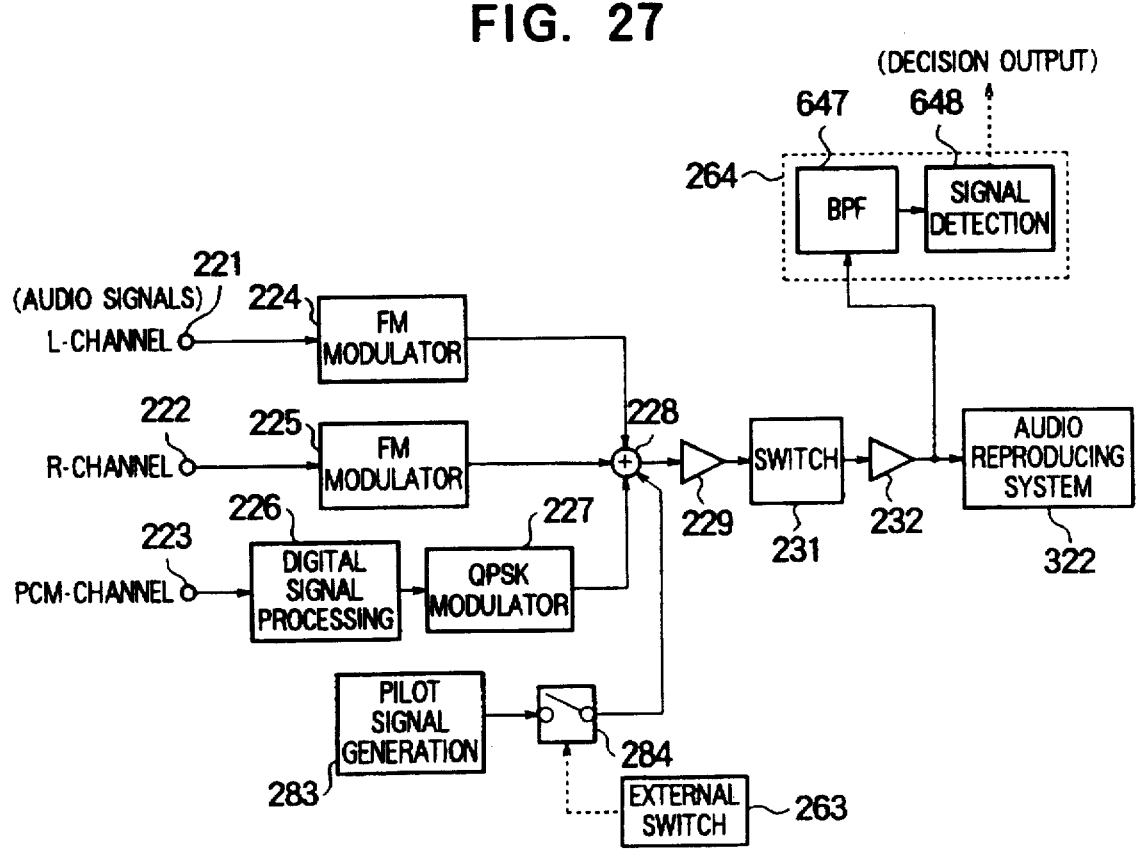
FIG. 27 is a block diagram showing the principal parts in a still additional embodiment of the rotary head type magnetic recording and reproducing apparatus according to the present invention.

FIG. 27 is a block diagram showing the principal portion of a still additional embodiment of the rotary head type magnetic recording and reproducing apparatus according to the present invention. The added parts different from those added in the embodiment described with reference to FIG. 25 are a pilot signal generator, a switch 284, a BPF 647, and a a signal detector 648.

In FIG. 27, the pilot signal generator 283 generates a pilot signal having a carrier allocated at a position in the frequency spectrum different from the bands of the audio signals of the L- and R- and PCM-channel audio signal. When a digital signal is recorded, the switch 284 is set in the ON state by the external switch 263, and the pilot signal is recorded multiplexed with the other audio signals. When an analog signal is recorded, the switch 284 is set in the OFF state, so that the pilot signal is not recorded. In reproduction, the reproduced and amplified audio signals are supplied to the BPF 647, signals of a band of the pilot signal are separated out, and the signal detector 648 outputs an analog/ digital decision signal according to determination of whether not there is included a frequency band carrier of the pilot signal.

Therefore, in this embodiment, by using a pilot signal of a frequency band different from that of the audio signals, the analog/digital change-over can be done easily.

In this embodiment, description has been made of a case where when the audio signals are recorded, the PCM-channel audio signal is always multiplex-recorded. However, this is not the only possible method, for example, only the audio signals of the L- and R-channels may be recorded.

In the embodiments shown in FIGS. 19, 20, 22, 23, 25, 26 and 27, another pair of magnetic heads (corresponding to 66a, 66b in FIG. 17) for recording and reproducing the current system analog video signal is not provided. If that pair of magnetic heads 66a, 66b is provided in those embodiments, the magnetic head arrangement on the rotary head 300 is as shown in the embodiment in FIG. 17.

In the above embodiments, description has been made of the cases where the compressed digital signal is always divided into two signals and the divided signals are recorded on two tracks. However, if a modulating method for modulating the compressed digital signal into a signal that can be recorded on one track is used, the compressed digital signal can be recorded on one track without dividing the signal into two signals, and by using such a modulating method, the amount of information to be recorded can be doubled.

As is clear from the above description, according to the above-mentioned embodiments, the analog wide-band video signal and the compressed digital signal can be recorded and reproduced on the same recording medium, and by using a analog/digital decision circuit, the analog signal and the digital signal can be changed over easily in reproduction.

When the compressed digital signal is recorded and reproduced, variable speed reproduction can be realized easily by making such an arrangement that the compressed digital signal is reproduced in normal speed reproduction and the analog signal recorded on another track is reproduced in variable speed reproduction.

Moreover, by further providing magnetic heads for recording and reproducing the current analog video signal, the magnetic recording and reproducing apparatus according to the present invention can have compatibility with the conventional VTR's such that magnetic tapes recorded under the S-VHS system and so on can also be reproduced.

We claim:

1. A rotary head type magnetic recording and reproducing apparatus comprising:

a first recording signal generating circuit for generating a first recording signal to be recorded on a magnetic tape from an input analog video signal;

a second recording signal generating circuit for generating a second recording signal to be recorded on said magnetic tape from an input analog audio signal;

a third recording signal generating circuit for generating a third recording signal to be recorded on said magnetic tape from an input compressed digital signal including video and audio information;

a recording and reproducing mechanism, operably connected to said first, second, and third recording signal generating circuits and including a plurality of recording and reproducing magnetic heads mounted on a rotary drum, for recording at least said first and third recording signals switchably and said second recording signal on said magnetic tape in recording, and for reproducing the recorded signals from said magnetic tape in reproduction;

a first reproducing circuit, operably connected to said recording and reproducing mechanism, for restoring said input analog video signal from said first recording signal reproduced by said recording and reproducing mechanism;

a second reproducing circuit, operably connected to said recording and reproducing mechanism, for restoring said input analog audio signal from said second recording signal reproduced by said recording and reproducing mechanism;

a third reproducing circuit, operably connected to said recording and reproducing mechanism, for restoring said video and audio information from said third recording signal reproduced by said recording and reproducing mechanism; and a change-over circuit for changing over said first and third recording signals according to which of said input analog video signal and said input compressed digital signal is to be recorded;

wherein said recording and reproducing magnetic heads include at least a first group of magnetic heads mounted on said rotary drum;

wherein said input analog video signal or input compressed digital signal is recorded on said magnetic tape by said first group of magnetic heads; and wherein said third recording signal generating circuit includes a circuit for converting said input compressed digital signal to have substantially the same frequency allocation as said input analog video signal, thereby generating said third recording signal.

2. A rotary head type magnetic recording and reproducing apparatus according to claim 1, wherein said recording and reproducing heads further include a second group of magnetic heads mounted on said rotary drum;

wherein said rotary head type magnetic recording and reproducing apparatus further comprises a fourth recording signal generating circuit for generating a fourth recording signal to be recorded on said magnetic tape by restoring said video information from said input compressed digital signal and down-converting said restored video information, and supplying said fourth recording signal to said second group of magnetic heads; and wherein when said input compressed digital signal is recorded, said fourth recording signal is recorded superposed over said second recording signal on said magnetic tape.

3. A rotary head type magnetic recording and reproducing apparatus according to claim 2, further comprising a circuit for restoring said video signal by up-converting said fourth recording signal reproduced by said second group of magnetic heads in reproduction.

4. A rotary head type magnetic recording and reproducing apparatus according to claim 2, wherein said second group of magnetic heads includes a first pair of magnetic heads for recording said second recording signal into a deeper-layer portion of said magnetic tape, and a second pair of magnetic heads having an azimuth angle different from that of said first pair of magnetic heads;

wherein said fourth recording signal generating circuit includes a circuit for down-converting said restored video information and a modulator circuit for obtaining a recording signal, having a frequency allocation different from that of said input analog audio signal, from said down-converted restored video information; and wherein said recording signal from said modulator circuit is recorded on audio tracks of said magnetic tape superposed over said second recording signal by said second pair of magnetic heads.

5. A rotary head type magnetic recording and reproducing apparatus according to claim 4, further comprising a fourth reproducing circuit, operably connected to said second pair of magnetic heads of said second group of magnetic heads, for restoring said video information from the signal reproduced by said second pair of magnetic heads.

6. A rotary head type magnetic recording and reproducing apparatus according to claim 2, further comprising a circuit for changing over between normal speed reproduction and variable speed reproduction;

wherein in variable speed reproduction, an audio signal is restored from said second recording signal and video information is restored from said fourth recording signal.

7. A rotary head type magnetic recording and reproducing apparatus according to claim 1, further comprising an identification signal adding circuit for adding to said magnetic tape an identification signal to show in response to said change-over circuit which of said input analog video signal and said input compressed digital signal the signal recorded on said magnetic tape is.

8. A rotary head type magnetic recording and reproducing apparatus according to claim 7, wherein said identification signal adding circuit includes a circuit for controlling the supply of said second recording signal to said recording and reproducing mechanism, and uses said second recording signal as said identification signal in such a way that only when said input analog video signal is recorded, said second recording signal is recorded on audio tracks of said magnetic tape.

9. A rotary head type magnetic recording and reproducing apparatus according to claim 8, further comprising a circuit for determining which has been recorded on the audio tracks, said input analog video signal or said input compressed digital signal, from whether or not said input analog audio signal has been recorded on said audio tracks.

10. A rotary head type magnetic recording and reproducing apparatus according to claim 7, wherein said second recording signal is a signal formed by having said input analog audio signal and a PCM-channel audio signal multiplexed in frequency; and wherein said identification signal adding circuit includes a circuit for setting 1 or 0 for an identification word to be included in said PCM-channel audio signal in response to output of said change-over circuit.

11. A rotary head type magnetic recording and reproducing apparatus according to claim 10, further comprising a circuit for determining which has been recorded on said magnetic tape, said input analog video signal or said input compressed digital signal, from said identification word in said PCM-channel audio signal.

12. A rotary head type magnetic recording and reproducing apparatus according to claim 7, wherein said second recording signal is divided into an L- (left) channel recording signal corresponding to an L-channel audio signal and an R- (right) channel recording signal corresponding to an R-channel audio signal; and wherein said identification signal adding circuit includes a circuit for recording on audio tracks of said magnetic tape either one of said L-channel recording signal and said R-channel recording signal when said compressed digital signal is selected by said change-over circuit.

13. A rotary head type magnetic recording and reproducing apparatus according to claim 12, further comprising a circuit for determining which has been recorded on said magnetic tape, said input analog video signal or said input compressed digital signal, from whether only either one of said L-channel recording signal and said R-channel recording signal has been recorded on said audio tracks.

14. A rotary head type magnetic recording and reproducing apparatus according to claim 7, wherein said identification signal adding circuit includes a circuit for recording on audio tracks of said magnetic tape a pilot signal located in a spectral position different from the frequency band of said input analog audio signal when said input compressed digital signal is selected by said change-over circuit.

15. A rotary head type magnetic recording and reproducing apparatus according to claim 14, further comprising a circuit for deciding which has been recorded on said magnetic tape, said input analog video signal or said input compressed digital signal, from whether said pilot signal has been recorded on said audio tracks.

16. A rotary head type magnetic recording and reproducing apparatus according to claim 1, wherein said third recording signal generating circuit includes a circuit for modulating said input compressed digital signal by quadrature amplitude modulation of 16 or more values.

17. A rotary head type magnetic recording and reproducing apparatus according to claim 1, wherein said third recording signal generating circuit includes:
- a circuit for randomizing said input compressed digital signal; and
- a circuit for performing a partial response process on said randomized signal.

18. A rotary head type magnetic recording and reproducing apparatus according to claim 1, wherein said third recording signal generating circuit includes:
- a circuit for coding said input compressed digital signal into a signal having reduced low frequency components; and
- a high pass filter for suppressing remaining low frequency components in said coded signal.

19. A rotary head type magnetic recording and reproducing apparatus according to claim 1, wherein said third recording signal generating circuit includes a circuit for modulating said input compressed digital signal by 4-phase quadrature phase shift keying modulation.

20. A rotary head type magnetic recording and reproducing apparatus comprising:
- a first recording signal generating circuit for generating a first recording signal to be recorded on a magnetic tape from an input analog video signal;
- a second recording signal generating circuit for generating a second recording signal to be recorded on said magnetic tape from an input analog audio signal;
- a third recording signal generating circuit for generating a third recording signal to be recorded on said magnetic tape from an input compressed digital signal including video and audio information;
- a recording and reproducing mechanism, operably connected to said first, second, and third recording signal generating circuits and including a plurality of recording and reproducing magnetic heads mounted on a rotary drum, for recording at least said first and third recording signals simultaneously or switchably and said second recording signal on said magnetic tape in recording, and for reproducing the recorded signals from said magnetic tape in reproduction;
- a first reproducing circuit, operably connected to said recording and reproducing mechanism, for restoring said input analog video signal from said first recording signal reproduced by said recording and reproducing mechanism;
- a second reproducing circuit, operably connected to said recording and reproducing mechanism, for restoring said input analog audio signal from said second recording signal reproduced by said recording and reproducing mechanism; and
- a third reproducing circuit, operably connected to said recording and reproducing mechanism, for restoring said video and audio information from said third recording signal reproduced by said recording and reproducing mechanism;
- wherein said recording and reproducing heads include a first group of magnetic heads mounted on said rotary drum, and a second group of magnetic heads mounted on said rotary drum;
- wherein said first recording signal is supplied to said first group of magnetic heads;
- wherein said second recording signal is supplied to said second group of magnetic heads; and
- wherein said third recording signal generating circuit includes a first converter circuit for converting said input compressed digital signal into a signal of a frequency band different from that of said second recording signal, and supplying said converted signal as said third recording signal to said second group of magnetic heads.

21. A rotary head type magnetic recording and reproducing apparatus according to claim 20, wherein said recording and reproducing magnetic heads include:
- a first group of magnetic heads for recording and reproducing said input analog video signal; and
- a second group of magnetic heads for recording and reproducing said input compressed digital signal.

22. A rotary head type magnetic recording and reproducing apparatus according to claim 21, wherein said first group of magnetic heads includes two pairs of magnetic heads mounted on said rotary drum for scanning two tracks of said magnetic tape at a time simultaneously;
- wherein said second group of magnetic heads includes first and second pairs of magnetic heads for scanning a track at a position different from said two tracks on said magnetic tape;
- wherein said first pair of magnetic heads records said second recording signal generated from said input analog audio signal in a deeper-layer portion of the track at said different position on said magnetic tape; and
- wherein said second pair of magnetic heads records said third recording signal generated from said input compressed digital signal in a shallow-layer portion of the track at said different position.

23. A rotary head type magnetic recording and reproducing apparatus according to claim 21, further comprising:
- a circuit for supplying to said second group of magnetic heads said second and third recording signals multiplexed in frequency; and
- a circuit for separating said signal reproduced from said magnetic tape by said second group of magnetic heads into audio signals and a compressed digital signal, supplying said audio signals to said second reproducing circuit, and supplying said compressed digital signal to said third reproducing circuit.

24. A rotary head type magnetic recording and reproducing apparatus according to claim 20, wherein said input analog video signal is an analog wide-band video signal;
- wherein said first group of magnetic heads includes two pairs of magnetic heads for scanning two tracks at a time simultaneously; and wherein said first recording signal generating circuit includes a second converter circuit for converting said analog wide-band video signal into video signals of two channels each of a narrow frequency band and supplying said video signals respectively to said two pairs of magnetic heads of said first group of magnetic heads.

25. A rotary head type magnetic recording and reproducing apparatus according to claim 20, wherein said second group of magnetic heads includes two pairs of magnetic heads; and wherein said second recording signal and said third recording signal from said first converter circuit are recorded respectively by said two pairs of magnetic heads of said second group of magnetic heads.

26. A rotary head type magnetic recording and reproducing apparatus according to claim 20, further comprising:

a circuit for generating a control signal when said magnetic recording and reproducing apparatus is set to a variable speed reproduction mode; and a change-over circuit, connected to said first and third reproducing circuits, for selectively sending output of said first reproducing circuit in response to said control circuit, thereby enabling variable speed reproduction to be performed.

27. A rotary head type magnetic recording and reproducing apparatus according to claim 20, wherein said recording and reproducing head further include a third group of magnetic heads mounted on said rotary drum at positions different from those of said first and second groups of magnetic heads; and wherein said rotary head type magnetic recording and reproducing apparatus further comprises:

a fourth recording signal generating circuit for receiving an input analog narrow-band video signal, generating a fourth recording signal to be recorded on said magnetic tape, and supplying the fourth recording signal to said third group of magnetic heads; and a fourth reproducing circuit, operably connected to said recording and reproducing mechanism, for restoring said input analog narrow-band video signal from said fourth recording signal reproduced by said recording and reproducing mechanism in reproduction.

28. A rotary head type magnetic recording and reproducing apparatus according to claim 27, wherein said fourth recording signal generating circuit includes a circuit for frequency-modulating a luminance signal of said input analog narrow-band video signal, converting a carrier chrominance signal of said input analog narrow-band video signal to a low frequency band, and supplying a composite signal of said frequency-modulated luminance signal and said low-frequency-converted carrier chrominance signal to said third group of magnetic heads; and wherein said fourth reproducing circuit includes a circuit for separating a signal reproduced from said magnetic tape by said third group of magnetic heads into a reproduced frequency-modulated luminance signal and a reproduced low-frequency-converted carrier chrominance signal, obtaining the luminance signal of said input analog narrow-band video sing by demodulating said reproduced frequency-modulated luminance signal, and obtaining the carrier chrominance signal of said input analog narrow-band video signal by converting said reproduced low-frequency-converted carrier chrominance signal by converting said reproduced low-frequency-converted carrier chrominance signal to a high frequency band, thereby restoring said input analog narrow-band video signal.

29. A rotary head type magnetic recording and reproducing apparatus according to claim 20, wherein said third recording signal generating circuit includes a circuit for modulating said input compressed digital signal by quadrature amplitude modulation of 16 or more values.

30. A rotary head type magnetic recording and reproducing apparatus according to claim 20, wherein said third recording signal generating circuit includes:

a circuit for randomizing said input compressed digital signal; and a circuit for performing a partial response process on said randomized signal.

31. A rotary head type magnetic recording and reproducing apparatus according to claim 20, wherein said third recording signal generating circuit includes:

a circuit for coding said input compressed digital signal into a signal having reduced low frequency components; and a high pass filter for suppressing remaining low frequency components in said coded signal.

32. A rotary head type magnetic recording and reproducing apparatus according to claim 20, wherein said third recording signal generating circuit includes a circuit for modulating said input compressed digital signal by 4-phase quadrature phase shift keying modulation.

* * * * *